US012208494B2

(12) United States Patent
Shi et al.

(10) Patent No.: US 12,208,494 B2
(45) Date of Patent: Jan. 28, 2025

(54) RATCHET WRENCH WITH DRIVE PINS

(71) Applicant: APEX BRANDS, INC., Apex, NC (US)

(72) Inventors: Minglin Shi, Shanghai (CN); Wanli Wu, Shanghai (CN); Cheng Yang, Shanghai (CN)

(73) Assignee: APEX BRANDS, INC., Apex, NC (US)

( * ) Notice: Subject to any disclaimer, the term of this patent is extended or adjusted under 35 U.S.C. 154(b) by 297 days.

(21) Appl. No.: 17/765,905

(22) PCT Filed: Oct. 1, 2019

(86) PCT No.: PCT/CN2019/109788
§ 371 (c)(1),
(2) Date: Apr. 1, 2022

(87) PCT Pub. No.: WO2021/062857
PCT Pub. Date: Apr. 8, 2021

(65) Prior Publication Data

US 2022/0331936 A1 Oct. 20, 2022

(51) Int. Cl.
*B25B 21/00* (2006.01)
*B25B 13/46* (2006.01)

(52) U.S. Cl.
CPC .......... *B25B 21/004* (2013.01); *B25B 13/465* (2013.01)

(58) Field of Classification Search
CPC .... B25B 13/466; B25B 13/465; B25B 21/004
See application file for complete search history.

(56) References Cited

U.S. PATENT DOCUMENTS 1,022,845 A 4/1912 Hipple
1,369,491 A 2/1921 Straehle
(Continued)

FOREIGN PATENT DOCUMENTS

CN 1597263 3/2005
CN 1898065 1/2007
(Continued)

OTHER PUBLICATIONS

International Search Report and Written Opinion of corresponding International Application No. PCT/CN2020/061946, mailed on Feb. 19, 2021, all enclosed pages cited.
(Continued)

*Primary Examiner* — David B. Thomas
(74) *Attorney, Agent, or Firm* — BURR & FORMAN LLP

(57) ABSTRACT

A ratchet wrench assembly is provided that includes a head, a ratchet gear, a yoke, one or more drive pins, a body, and a ratchet pawl. The body may include one or more drive edges and a fastener drive member. A first drive edge may be engaged with a first drive pin such that reciprocation of the yoke causes rotation of the body and the fastener drive member about the axis of rotation via engagement of the first drive pin between the inner surface of the yoke ring and the first drive edge. The ratchet pawl may include a first ratchet tooth configured ratchet against gear teeth of the ratchet gear to permit movement of the body relative to the head in a first rotational direction and engage the gear teeth to prevent movement of the body relative to the head in second, opposite rotational direction.

20 Claims, 22 Drawing Sheets

(56) References Cited

U.S. PATENT DOCUMENTS

| | | | | |
|---|---|---|---|---|
| 2,344,673 | A | 3/1944 | Brown | |
| 2,671,484 | A | 3/1954 | Clark | |
| 3,630,108 | A | 12/1971 | Stillwagon, Jr. | |
| 3,640,158 | A * | 2/1972 | Myers | B25B 13/466 81/58.3 |
| 3,744,350 | A | 7/1973 | Raff | |
| 3,779,038 | A | 12/1973 | Stuemky | |
| 3,859,821 | A | 1/1975 | Wallace | |
| 3,874,194 | A | 4/1975 | Filepp | |
| 4,346,630 | A | 8/1982 | Hanson | |
| 4,669,339 | A | 6/1987 | Cartwright | |
| 4,830,001 | A | 5/1989 | Walus | |
| 4,987,802 | A * | 1/1991 | Chern | B25B 21/004 81/57.39 |
| 4,987,803 | A * | 1/1991 | Chern | B25B 21/004 81/57.39 |
| 5,180,042 | A | 1/1993 | Ogiso | |
| 5,839,518 | A | 11/1998 | Setsuko | |
| 5,868,047 | A | 2/1999 | Faust et al. | |
| D410,372 | S | 6/1999 | Strauch | |
| 6,067,881 | A * | 5/2000 | Albertson | B25B 13/462 81/59.1 |
| 6,101,901 | A * | 8/2000 | Daigle | B25B 13/466 81/60 |
| 6,105,473 | A | 8/2000 | Huang | |
| 6,330,846 | B1 | 12/2001 | Strauch | |
| 6,345,560 | B1 | 2/2002 | Strauch | |
| 6,568,693 | B2 | 5/2003 | Glass | |
| 6,640,911 | B2 | 11/2003 | Lieser et al. | |
| 6,684,740 | B2 | 2/2004 | Lin | |
| 7,069,819 | B2 * | 7/2006 | Albertson | B25B 13/462 81/177.85 |
| 7,096,768 | B1 | 8/2006 | Chen | |
| 7,172,236 | B1 | 2/2007 | Chevtsov | |
| 7,197,968 | B2 | 4/2007 | Bubel | |
| 7,213,491 | B1 * | 5/2007 | Thompson | B25B 13/466 81/58.3 |
| 7,261,023 | B2 | 8/2007 | Taguchi | |
| 7,467,576 | B2 | 12/2008 | Gao | |
| 7,469,909 | B2 | 12/2008 | Strauch et al. | |
| 7,597,031 | B2 | 10/2009 | Chiang | |
| D623,036 | S | 9/2010 | DeBaker | |
| 7,810,817 | B1 | 10/2010 | Gao | |
| 8,109,183 | B2 | 2/2012 | Santamarina et al. | |
| 8,117,950 | B2 | 2/2012 | Kozak et al. | |
| 8,172,236 | B2 | 5/2012 | Shibata | |
| 8,226,337 | B2 | 7/2012 | Komine et al. | |
| 8,695,461 | B2 | 4/2014 | Moss et al. | |
| D711,719 | S | 8/2014 | DeBaker | |
| D717,719 | S | 11/2014 | Sagen | |
| 8,876,120 | B2 | 11/2014 | Chen | |
| 8,955,418 | B2 | 2/2015 | Peters et al. | |
| 9,095,961 | B1 | 8/2015 | Lenfest | |
| 9,107,721 | B2 | 8/2015 | Plotkin | |
| 9,120,213 | B2 * | 9/2015 | Elger | B25B 21/004 |
| D752,408 | S | 3/2016 | Moss et al. | |
| 9,283,661 | B2 | 3/2016 | Cummings et al. | |
| 9,469,017 | B2 | 10/2016 | Seith et al. | |
| 9,649,696 | B2 | 5/2017 | Teusch | |
| D789,761 | S | 6/2017 | Moss et al. | |
| 9,695,882 | B2 | 7/2017 | Jakoubek | |
| 9,764,452 | B2 | 9/2017 | Koch | |
| 9,943,946 | B2 | 4/2018 | Peters | |
| 10,022,845 | B2 | 7/2018 | Neitzell | |
| 10,166,657 | B2 | 1/2019 | Cummings et al. | |
| 10,245,646 | B2 | 4/2019 | Ha | |
| 10,315,296 | B2 | 6/2019 | Victor | |
| 10,376,964 | B2 | 8/2019 | Fronius et al. | |
| 10,513,017 | B2 | 12/2019 | Lourenco et al. | |
| 10,568,391 | B2 | 2/2020 | Glancy et al. | |
| 10,991,489 | B2 | 4/2021 | Schneider et al. | |
| 11,059,151 | B2 | 7/2021 | Cummings et al. | |
| 11,338,413 | B2 * | 5/2022 | Zhao | B25B 13/462 |
| 11,364,606 | B2 | 6/2022 | Fairchild et al. | |
| 11,491,554 | B2 | 11/2022 | de Swardt | |
| 2002/0102143 | A1 * | 8/2002 | Huang | B25B 13/466 81/63.1 |
| 2005/0061113 | A1 * | 3/2005 | Horvath | B25B 21/004 81/57.39 |
| 2005/0087041 | A1 * | 4/2005 | Albertson | B25B 23/0035 81/57.39 |
| 2006/0009297 | A1 | 1/2006 | Hubiak et al. | |
| 2006/0230887 | A1 | 10/2006 | Taguchi | |
| 2007/0028724 | A1 * | 2/2007 | Albertson | B25B 13/462 81/177.85 |
| 2007/0084311 | A1 * | 4/2007 | Albertson | B25B 21/004 81/57.39 |
| 2007/0099712 | A1 | 5/2007 | Smihal | |
| 2007/0234856 | A1 | 10/2007 | Liu | |
| 2009/0311061 | A1 | 12/2009 | Santamarina et al. | |
| 2010/0064860 | A1 | 3/2010 | Kozak et al. | |
| 2011/0036212 | A1 | 2/2011 | Santamarina et al. | |
| 2011/0170964 | A1 | 7/2011 | Rabate et al. | |
| 2014/0157961 | A1 * | 6/2014 | Chen | B25B 21/02 81/464 |
| 2015/0096778 | A1 | 4/2015 | Schneider | |
| 2016/0038210 | A1 | 2/2016 | Plotkin | |
| 2016/0325411 | A1 | 11/2016 | Wang | |
| 2019/0232470 | A1 | 8/2019 | Xu | |
| 2019/0293041 | A1 | 9/2019 | Dong et al. | |
| 2020/0215675 | A1 | 7/2020 | Hawkins | |
| 2021/0331302 | A1 | 10/2021 | Fairchild et al. | |

FOREIGN PATENT DOCUMENTS

| | | | |
|---|---|---|---|
| CN | 102470516 | | 5/2012 |
| CN | 102744700 | | 10/2012 |
| CN | 104786184 | | 7/2015 |
| CN | 208147717 | | 11/2018 |
| EP | 0968793 | B1 | 10/2003 |
| EP | 2098336 | A2 | 9/2009 |
| EP | 2098336 | A3 | 10/2011 |
| EP | 2130648 | B1 | 3/2016 |
| JP | S623036 | A | 1/1987 |
| WO | WO-2012049078 | A1 | 4/2012 |
| WO | WO-2018204468 | A1 | 11/2018 |
| WO | WO-2020005805 | A1 | 1/2020 |

OTHER PUBLICATIONS

International Search Report and Written Opinion from international application No. PCT/US2021/049371 mailed on Dec. 21, 2021, all pages enclosed cited in its entirety.

Non-Final Office Action from related U.S. Appl. No. 17/368,489 mailed on Oct. 4, 2021, all pages enclosed cited in its entirety.

International Search Report and Written Opinion from international application No. PCT/US2021/049374 mailed on Sep. 24, 2021, all pages enclosed cited in its entirety.

PCT/US2021/049374 mailed on Sep. 24, 2021, all pages enclosed cited in its entirety. International Search Report and Written Opinion from international application number.

International Search Report and Written Opinion from international application No. PCT/CN2019/109788 mailed on Jun. 24, 2020, all pages enclosed cited in its entirety.

Extended European Search Report issued in European Application No. 20926068.6 on Mar. 21, 2024, all enclosed pages cited.

* cited by examiner

RATCHET WRENCH WITH DRIVE PINS

TECHNICAL FIELD

Example embodiments generally relate to wrenches, and more particularly, relate to ratcheting wrenches including powered ratcheting wrenches.

BACKGROUND

Ratchet wrenches have long proven to be highly efficient tools for affixing and removing fasteners by avoiding the need to remove and reposition the wrench for each turn, particularly in space-limited environments. The continued engagement between the ratchet wrench and the fastener greatly increases the efficiency of operating on the fastener by eliminating the need to reposition the wrench on the fastener for each turn.

To further increase the efficiency of ratchet wrenches, powered ratchet wrenches have been developed. Such powered wrenches offer the benefits of a hand-turn ratchet wrench, but also offer the functionality of turning the fastener via a motor (e.g., electric, pneumatic, or the like). Some powered ratchet wrenches rely on hand-turning for high-torque operations (e.g., initial loosening or final tightening of a fastener) and support low-torque operations via powered turning of the wrench. Allowing for both hand-turn ratcheting and powered rotation of a fastener with the same tool can bring complexity to the tool design. While the functionality of such powered ratcheting wrenches has been developed, such solutions are often large in physical size and cumbersome to transition between hand-turn and power-turn modes. As such, there continues to be a need for innovation and improvement to develop a compact, easy to operate, powered ratchet wrench.

SUMMARY OF SOME EXAMPLES

According to some example embodiments, an example ratchet wrench assembly is provided. The example ratchet wrench assembly may comprise a head, a ratchet gear, a yoke, at least one drive pin, a body, and a ratchet pawl. The ratchet gear may be disposed within the head and may comprise gear teeth. The yoke may be disposed within the head and may be configured to reciprocate about an axis of rotation for rotating a fastener. The yoke may comprise a yoke ring. The body may comprise at least one drive edge and a fastener drive member. A first drive edge of the at least one drive edge may be engaged with a first drive pin of the at least one drive pin such that reciprocation of the yoke causes rotation of the body and the fastener drive member about the axis of rotation via engagement of the first drive pin between the inner surface of the yoke ring and the first drive edge. The ratchet pawl may comprise a first ratchet tooth. The first ratchet tooth may be configured to ratchet against the gear teeth of the ratchet gear to permit movement of the body relative to the head in a first rotational direction and engage the gear teeth to prevent movement of the body relative to the head in second rotational direction. The second rotational direction may be opposite the first rotational direction.

According to some example embodiments, another ratchet wrench assembly is provided. The example ratchet wrench assembly may include a head, a ratchet gear, a yoke, a motor assembly, at least one drive pin, a body, and a ratchet pawl. The ratchet gear may be disposed within the head and may comprise gear teeth. The yoke may be disposed within the head and may be configured to reciprocate about an axis of rotation for rotating a fastener. The yoke may comprise a yoke ring. The motor assembly may be powered by a battery, and the motor assembly may comprise a motor configured to operably couple with the yoke to generate the reciprocating motion of the yoke about the axis of rotation in response to rotational movement of a shaft of the motor. The body may comprise at least one drive edge and a fastener drive member. A first drive edge of the at least one drive edge may be engaged with a first drive pin of the at least one drive pins such that reciprocation of the yoke may cause rotation of the body and the fastener drive member about the axis of rotation via engagement of the first drive pin between the inner surface of the yoke ring and the first drive edge. The ratchet pawl may comprise a first ratchet tooth. The first ratchet tooth may be configured to ratchet against the gear teeth of the ratchet gear to permit movement of the body relative to the head in a first rotational direction and engage the gear teeth to prevent movement of the body relative to the head in second rotational direction. The second rotational direction may be opposite the first rotational direction.

BRIEF DESCRIPTION OF THE DRAWINGS

Figure 1:
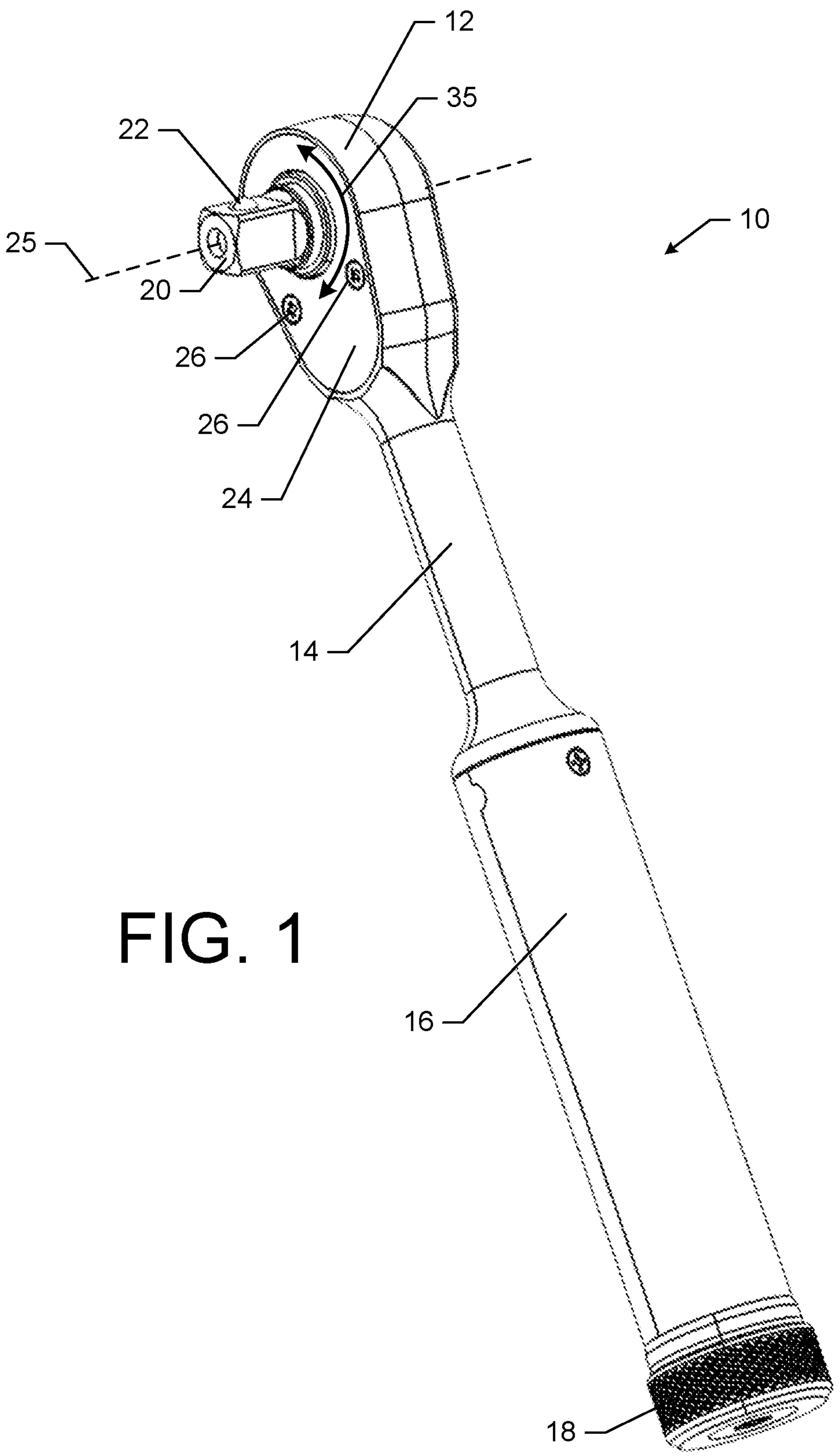
Figure 2:
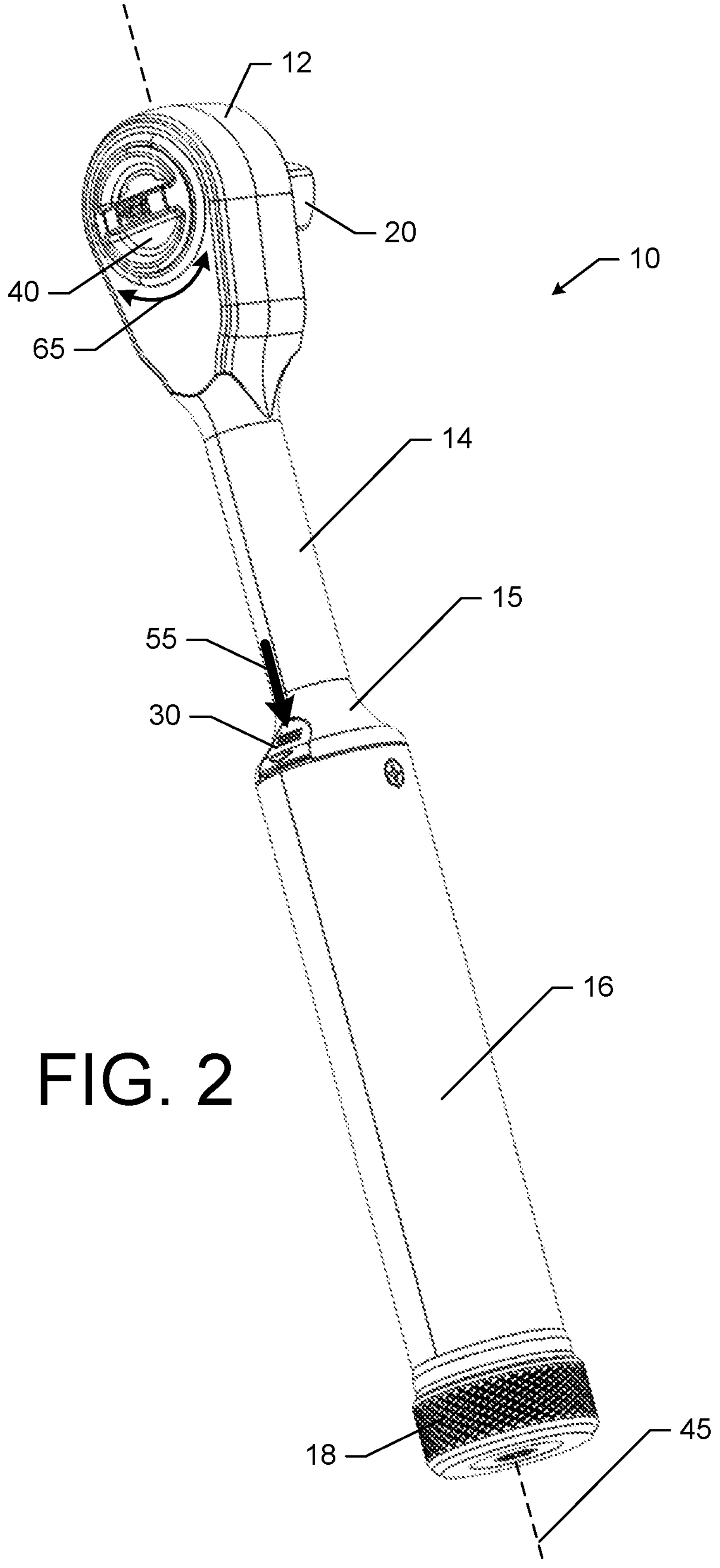
Figure 3:
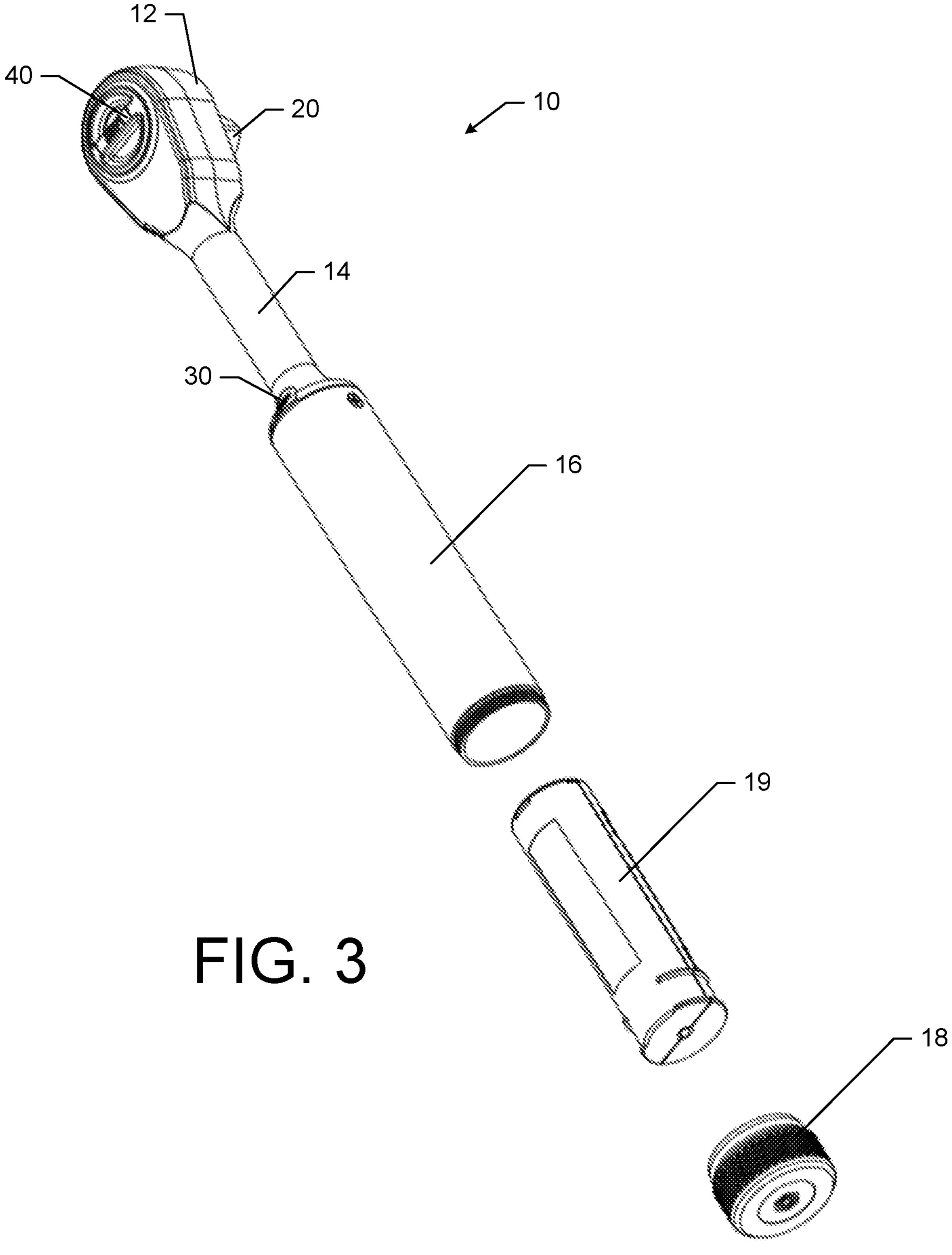
Figure 4A:
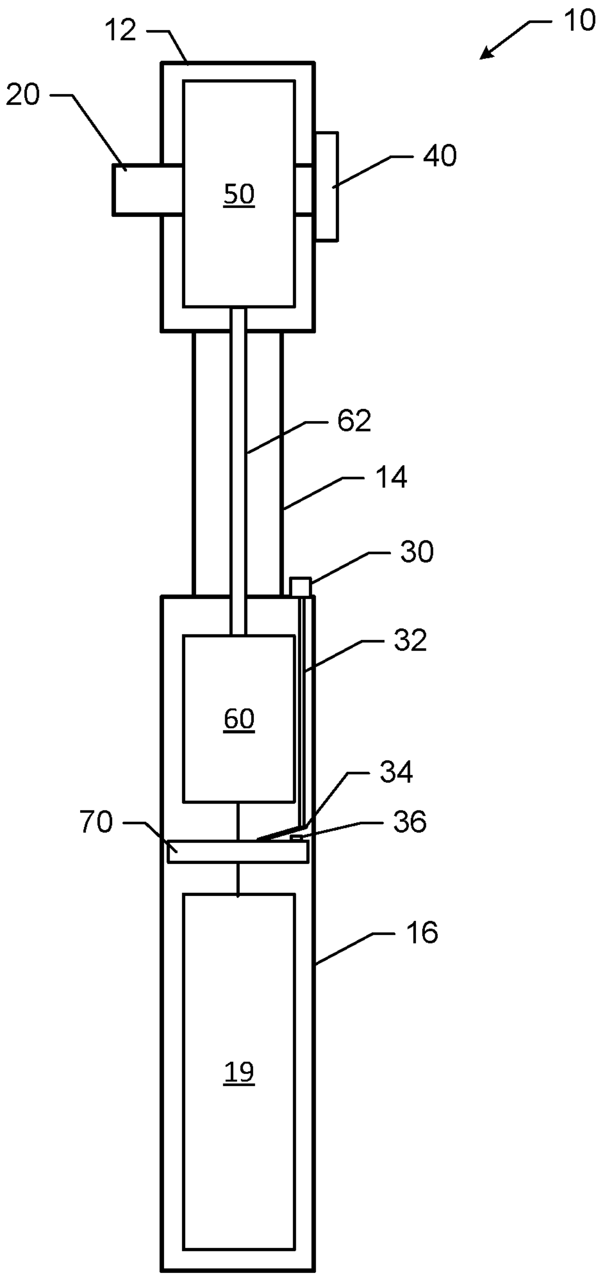
Figure 4B:
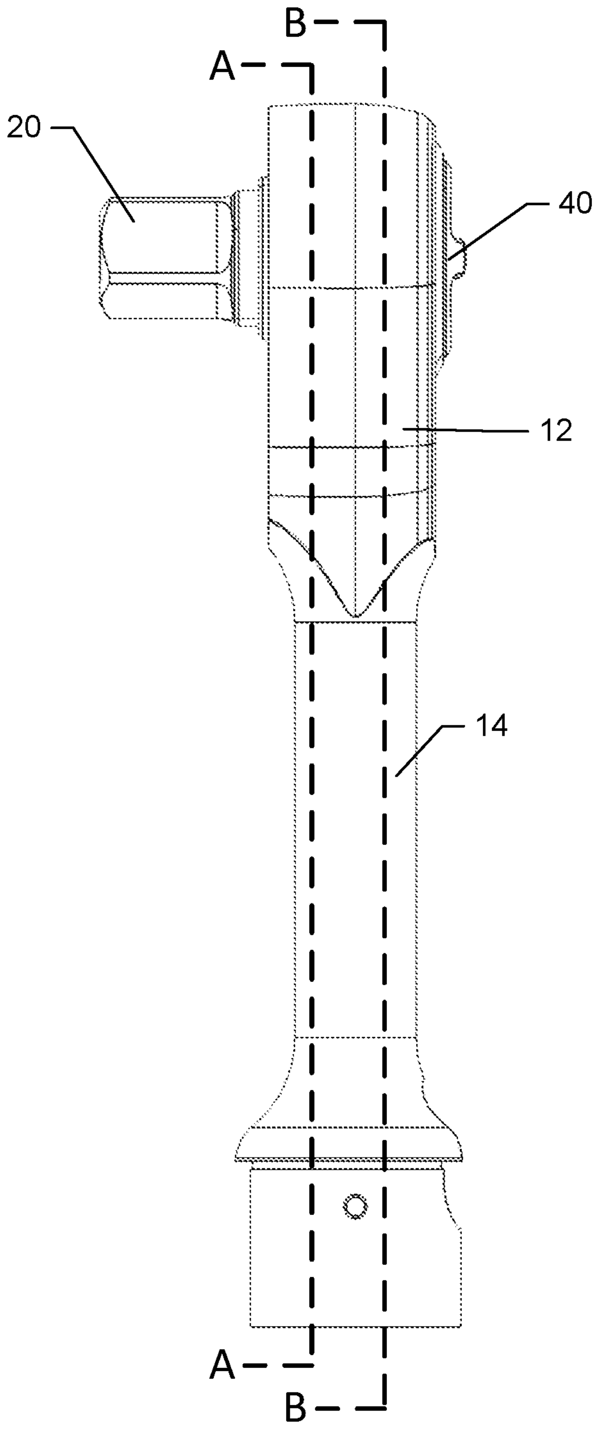
Figure 5:
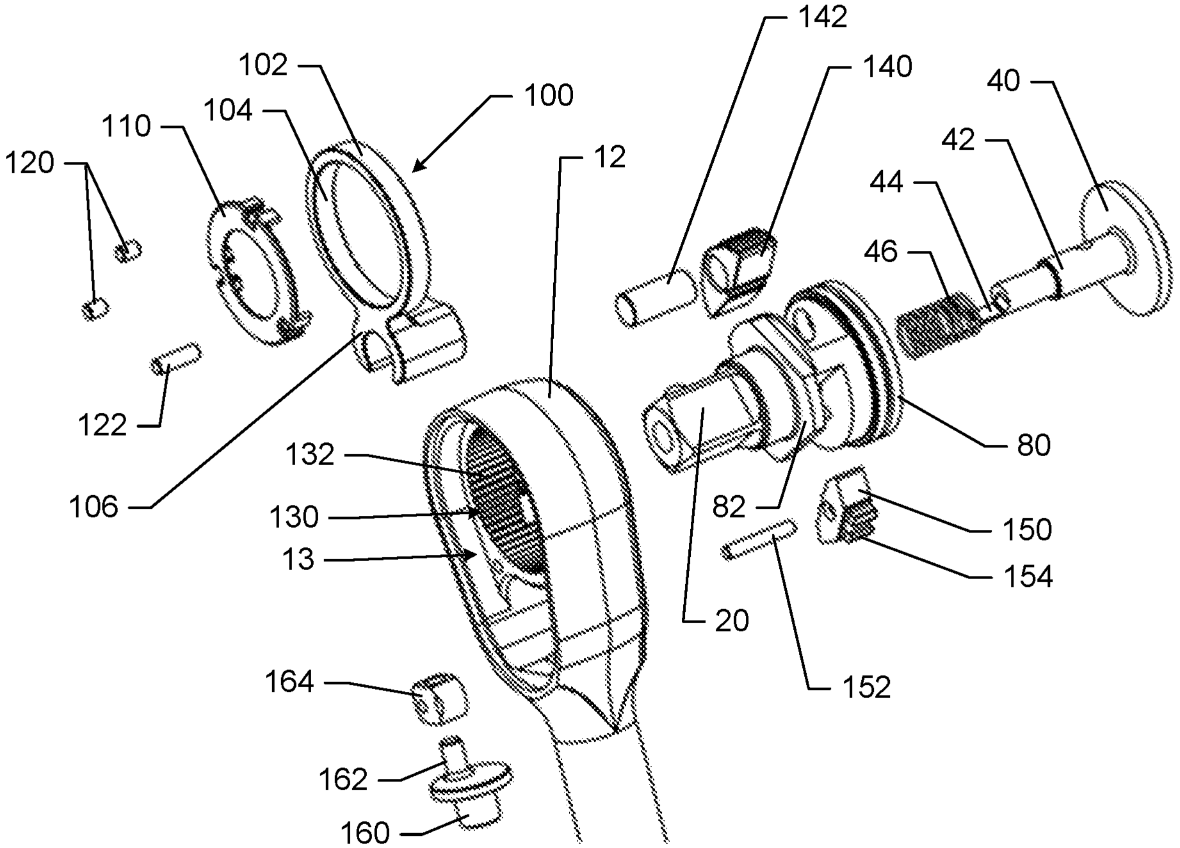
Figure 6:
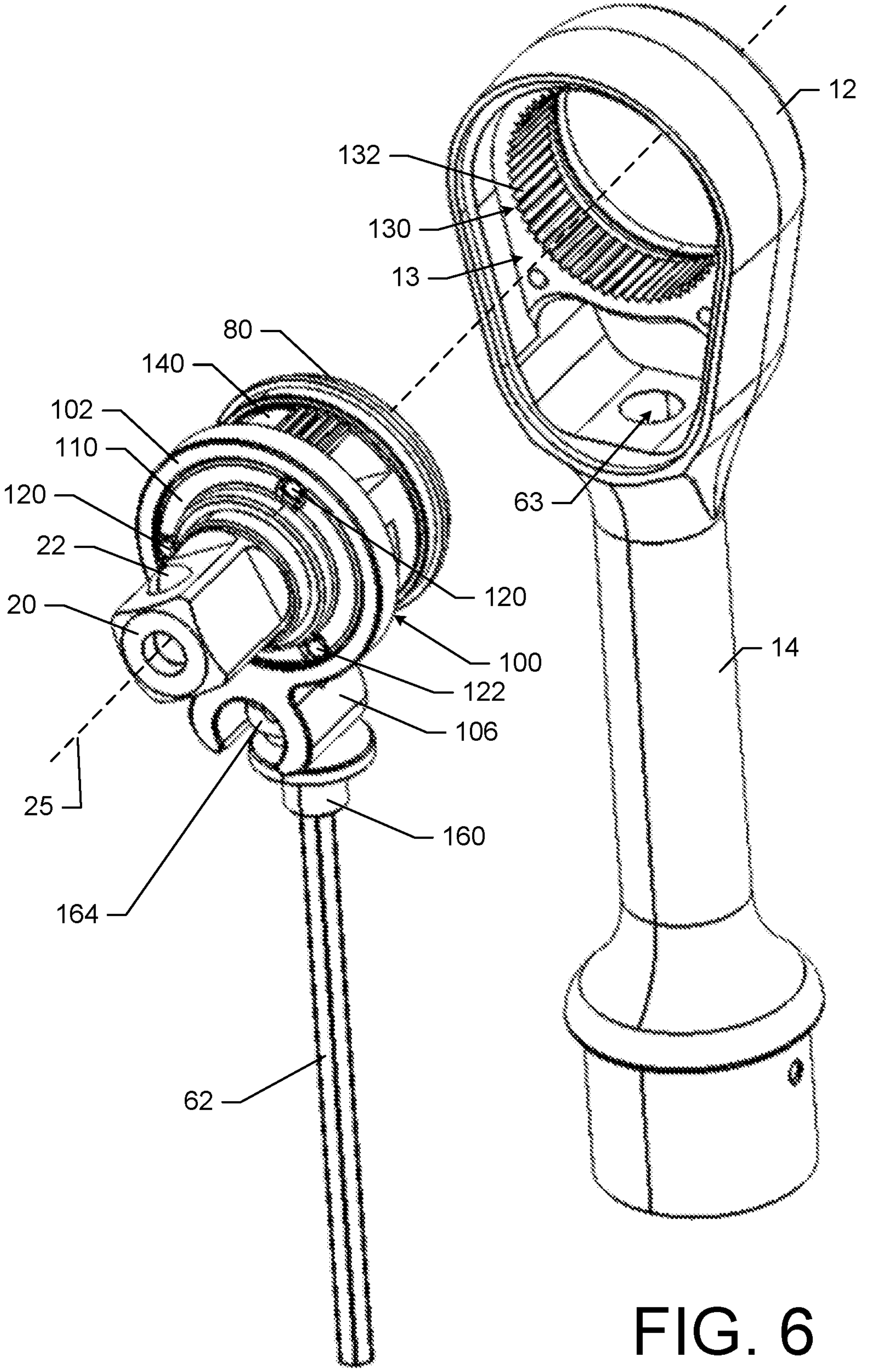
Figure 7:
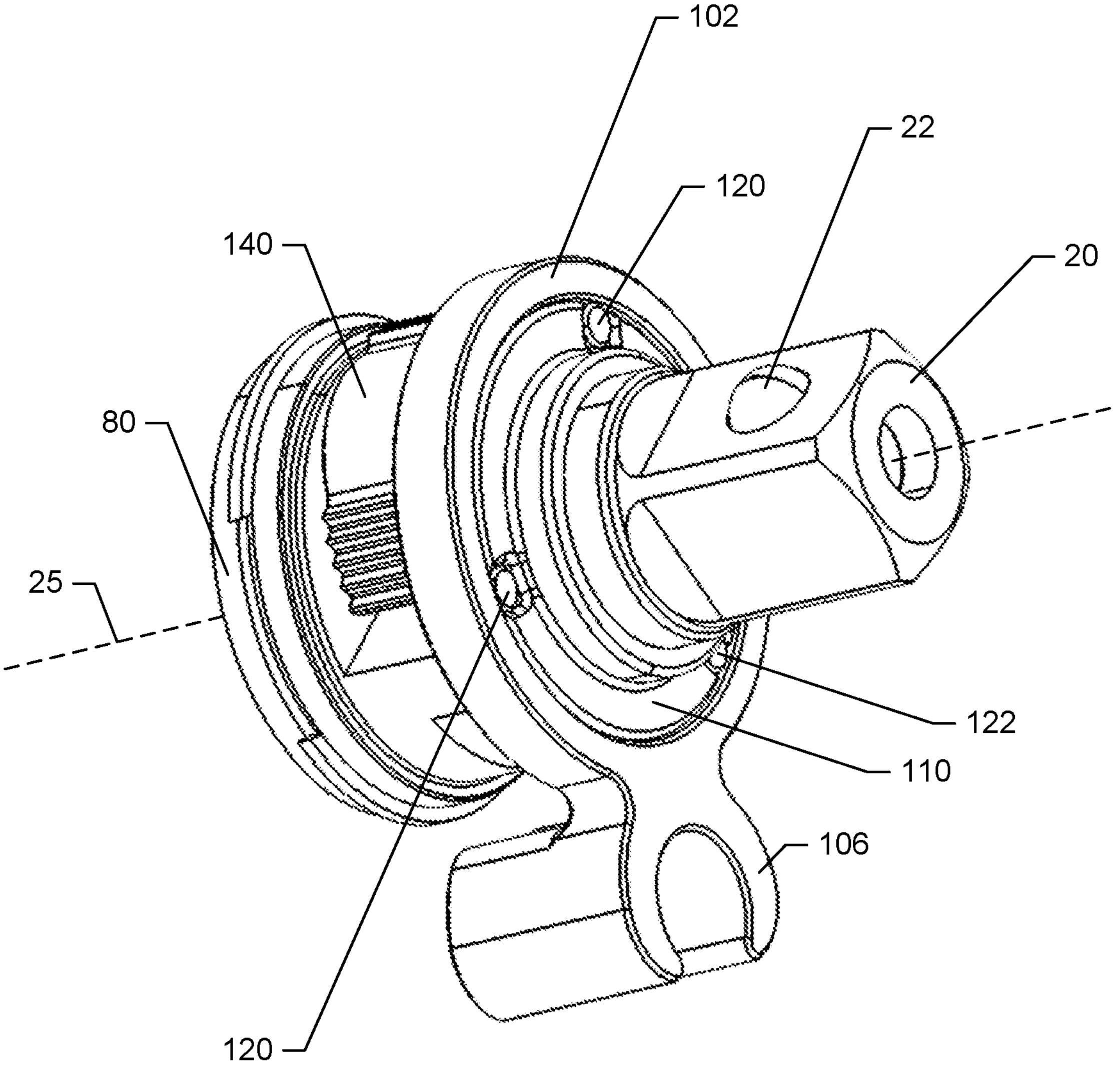
Figure 8:
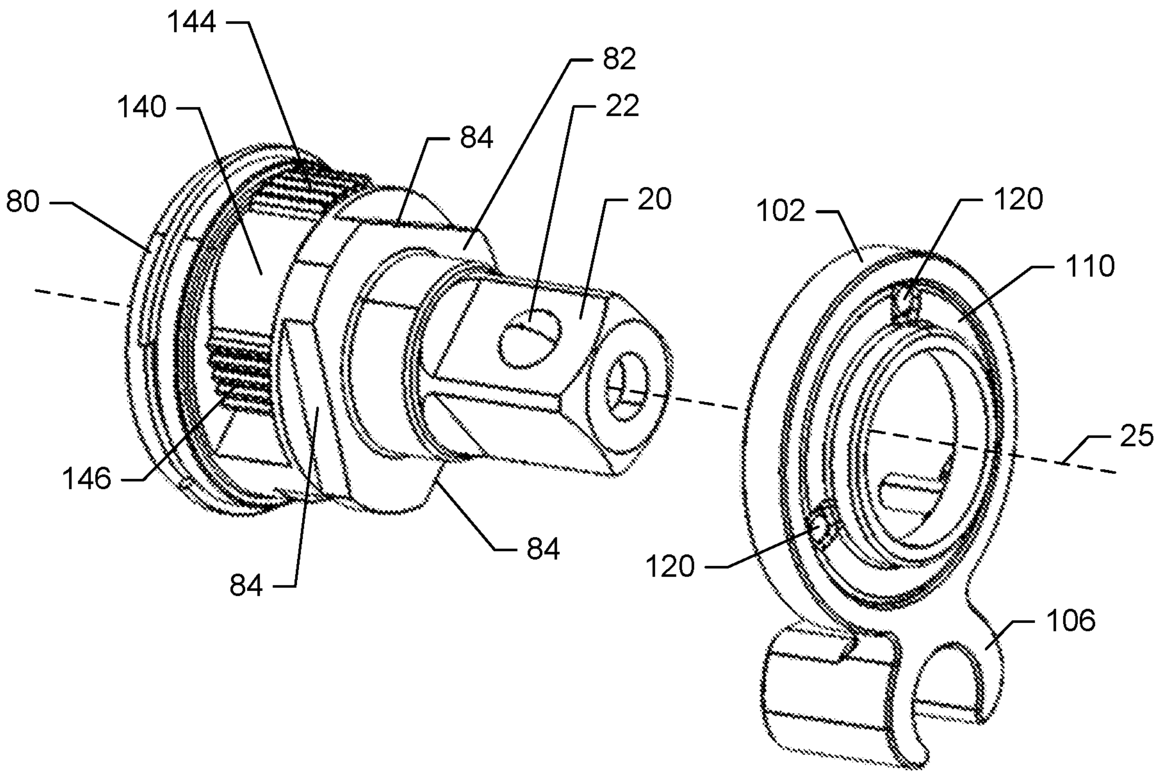
Figure 9:
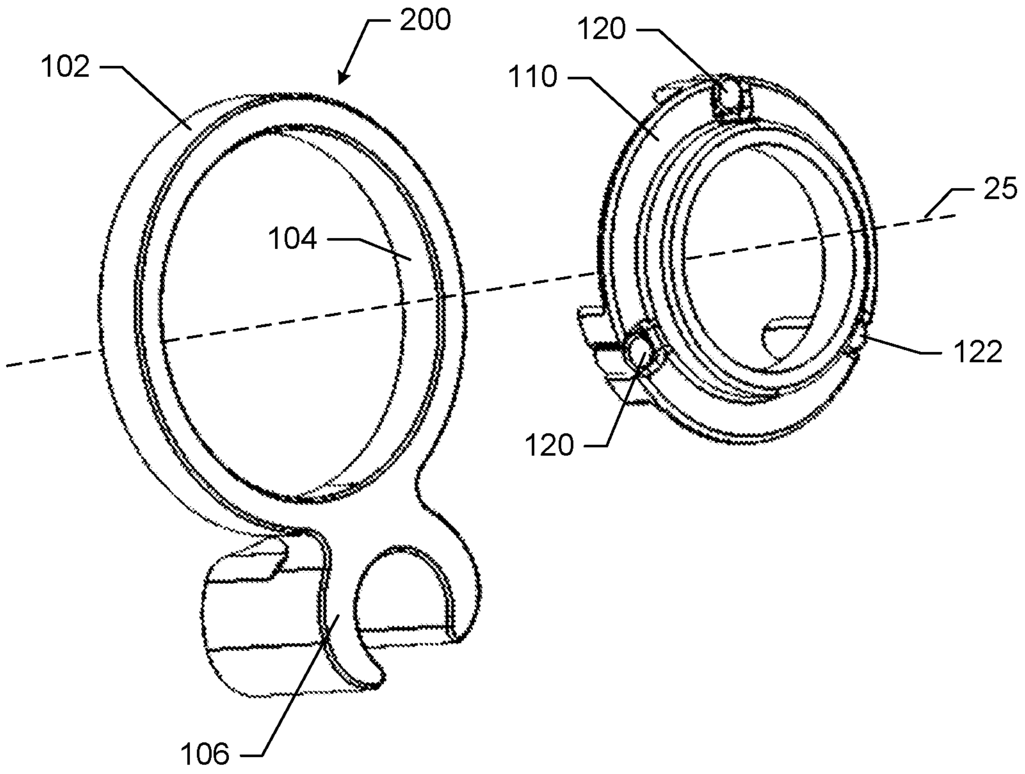
Figure 10:
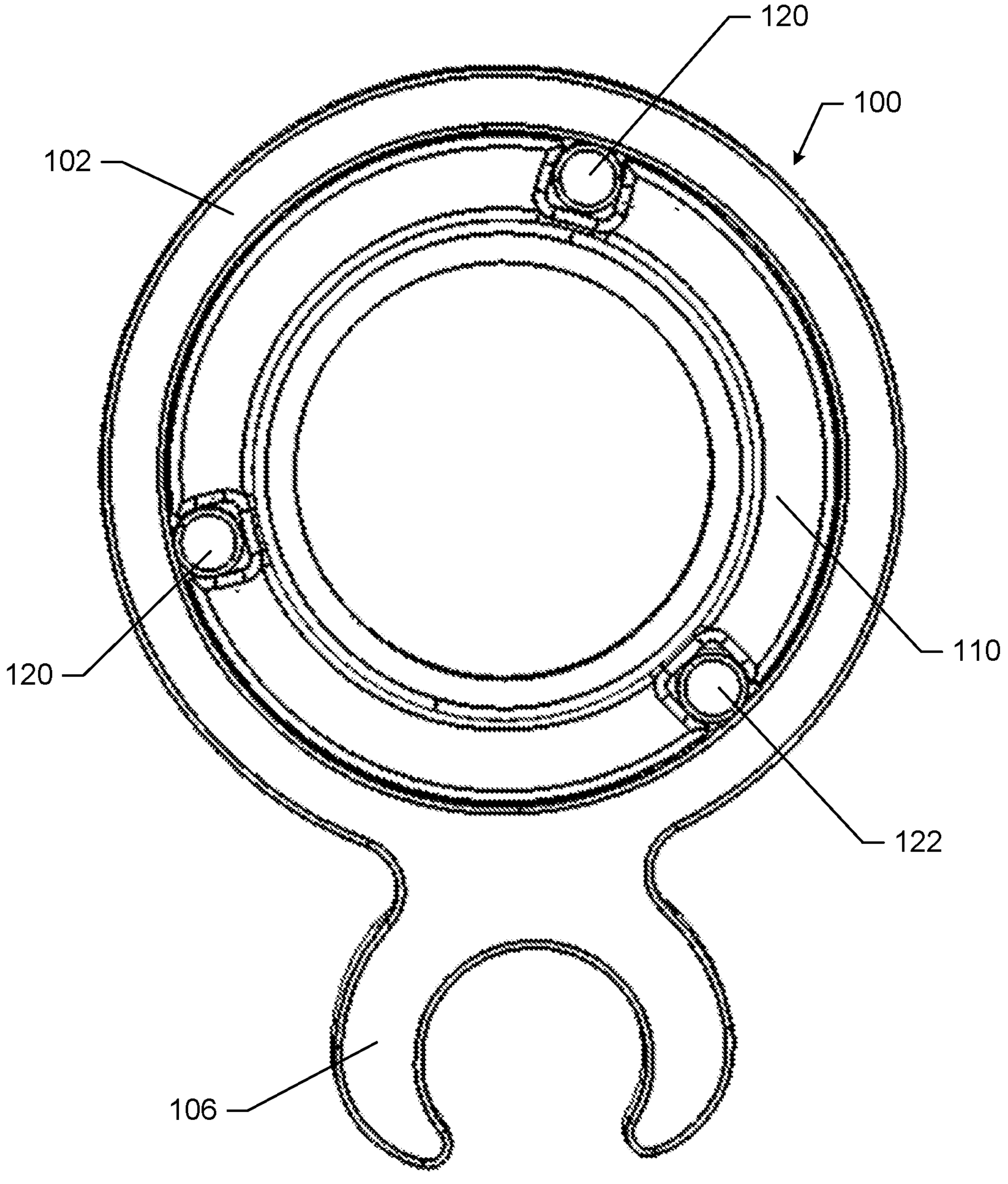
Figure 11:
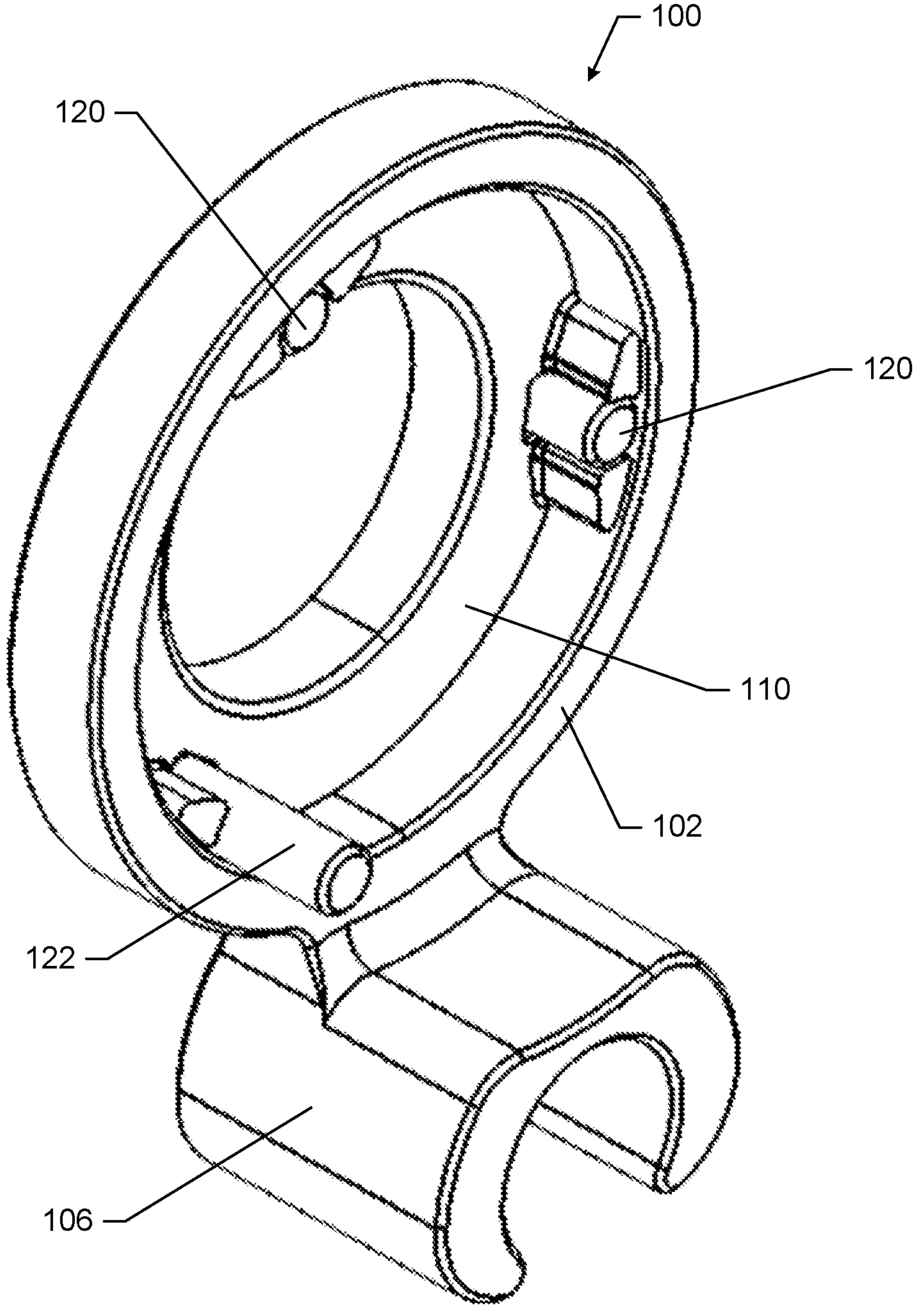
Figure 12:
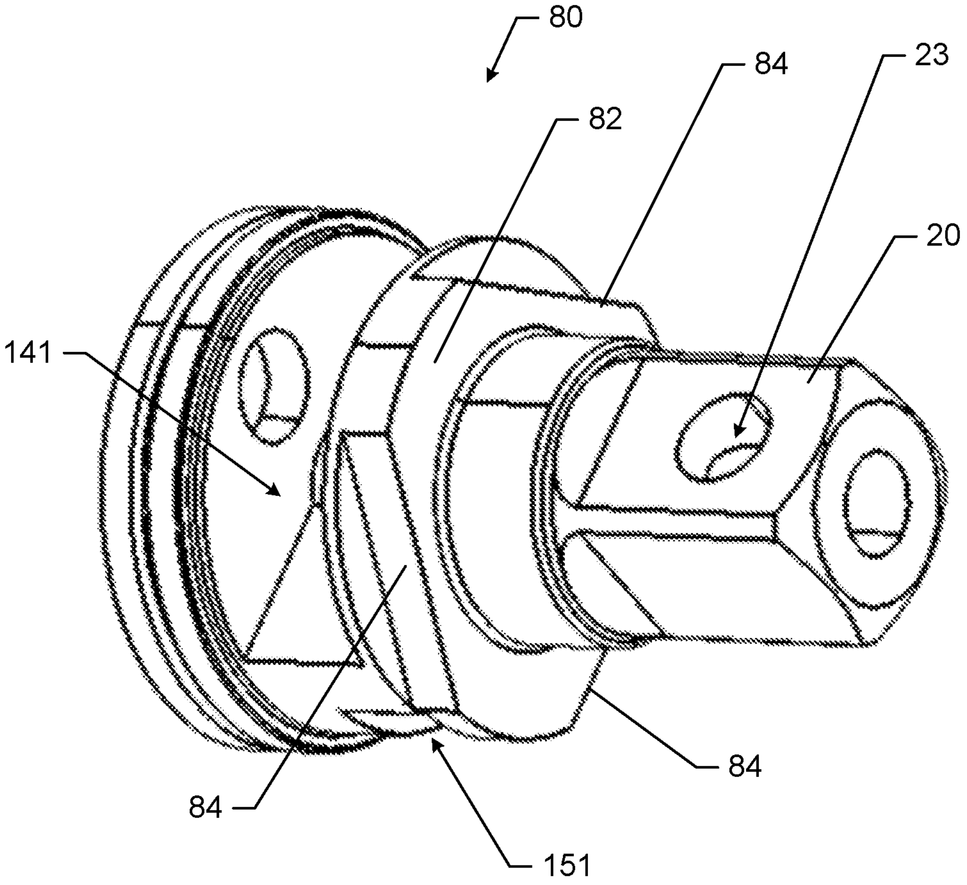
Figure 13:
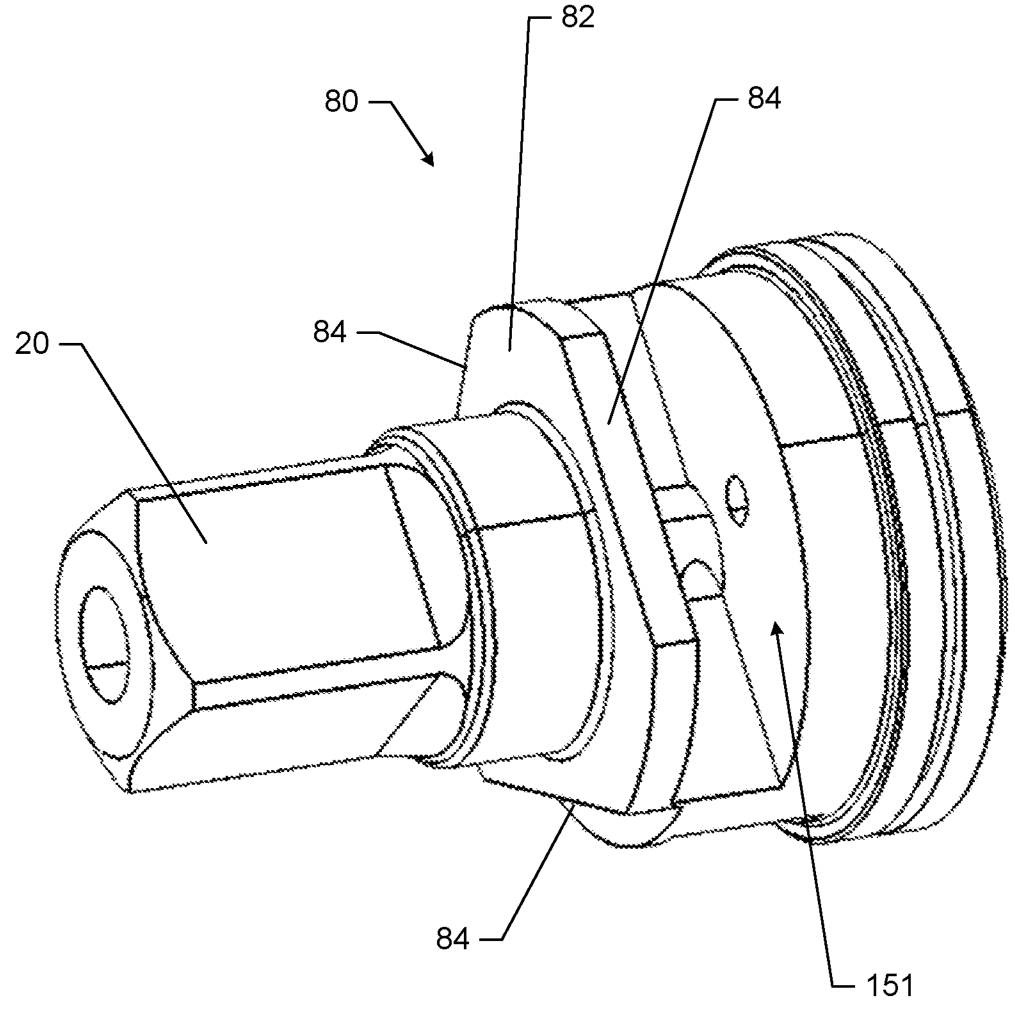
Figure 14:
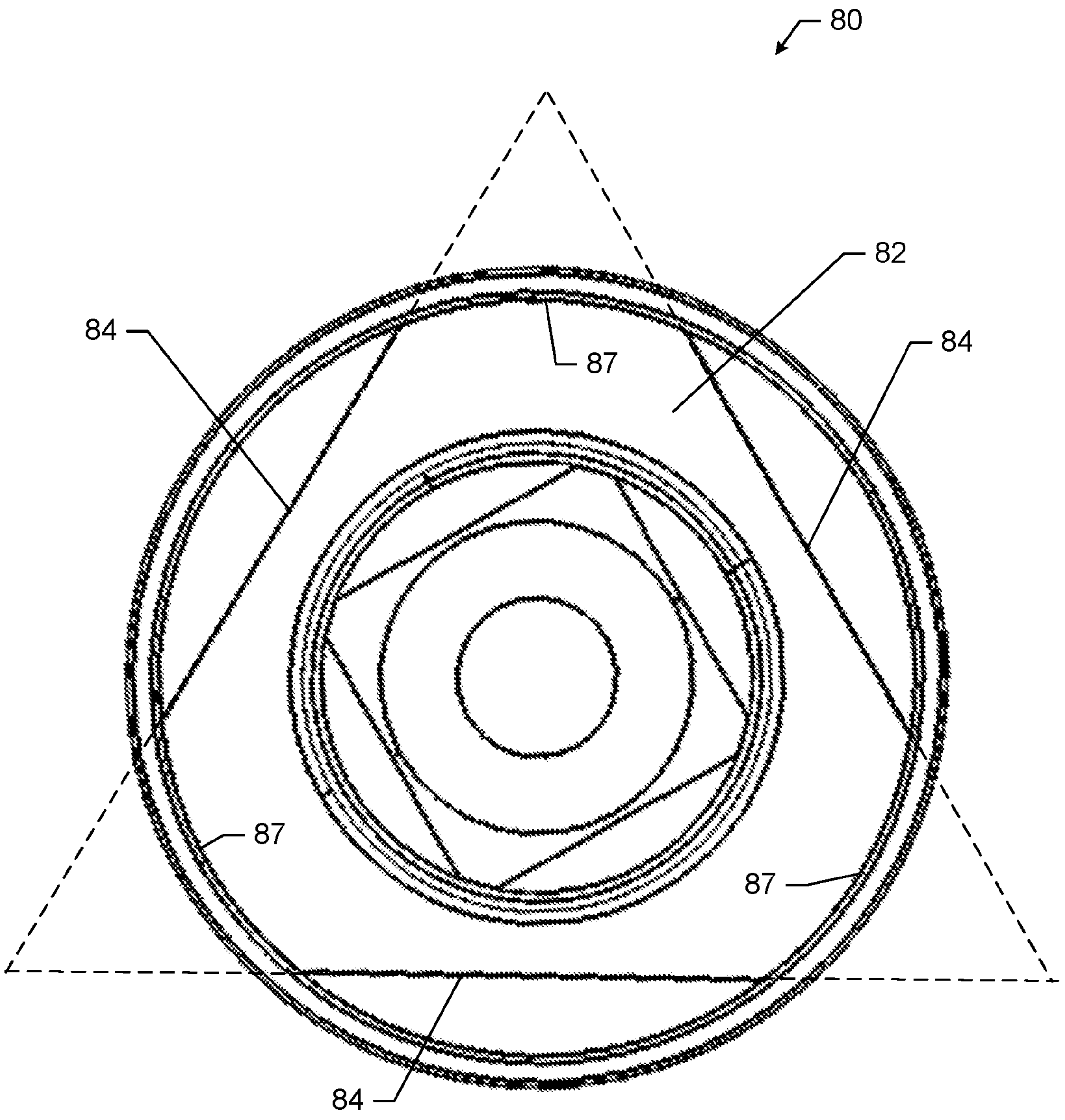
Figure 15:
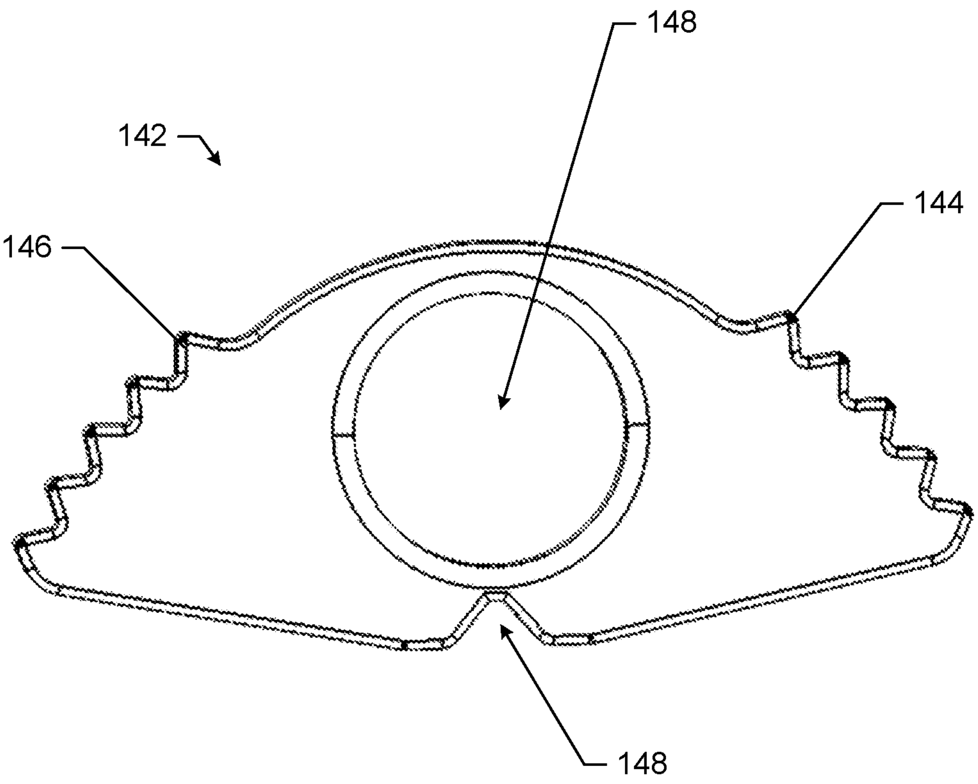
Figure 16:
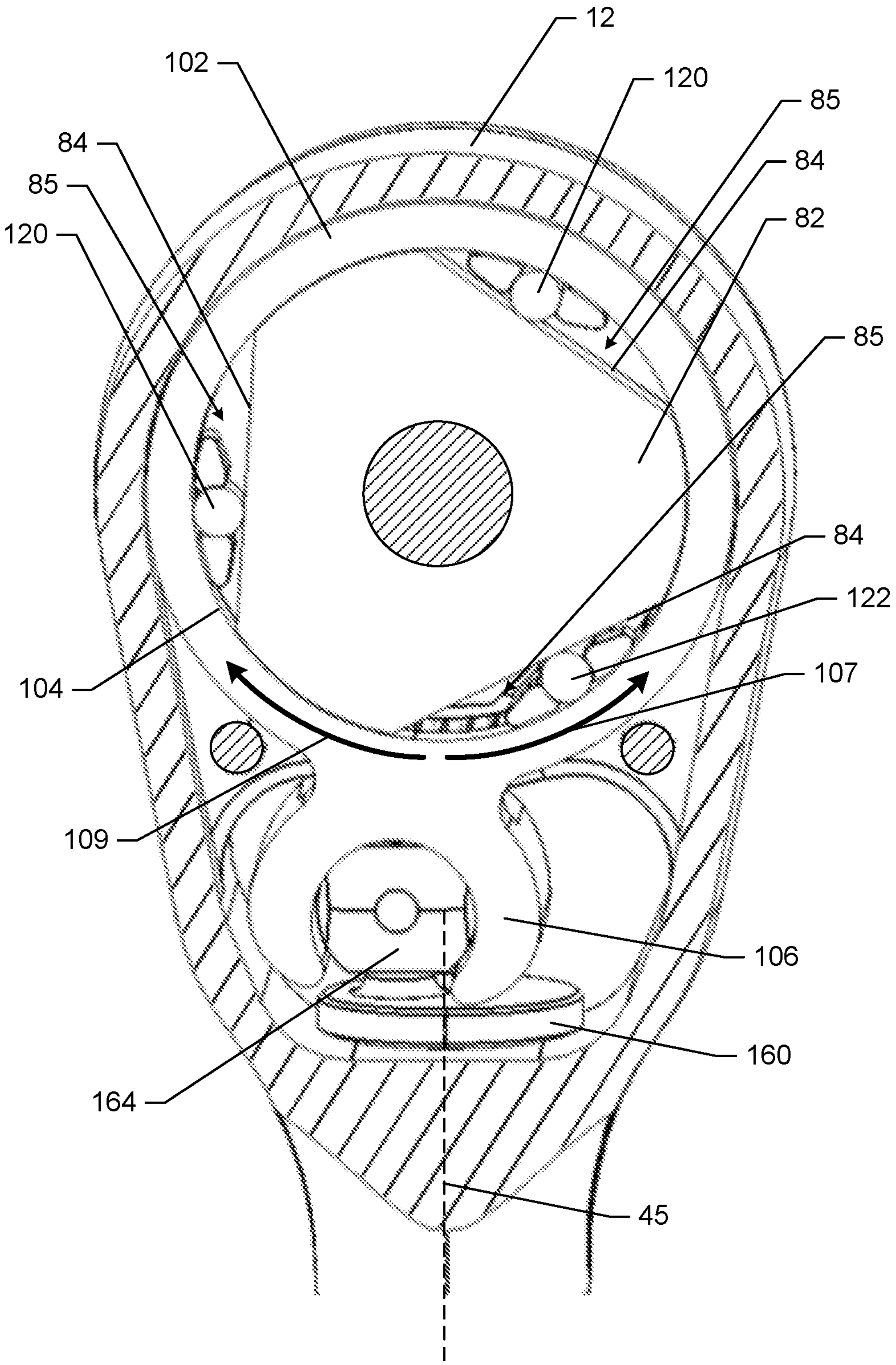
Figure 17:
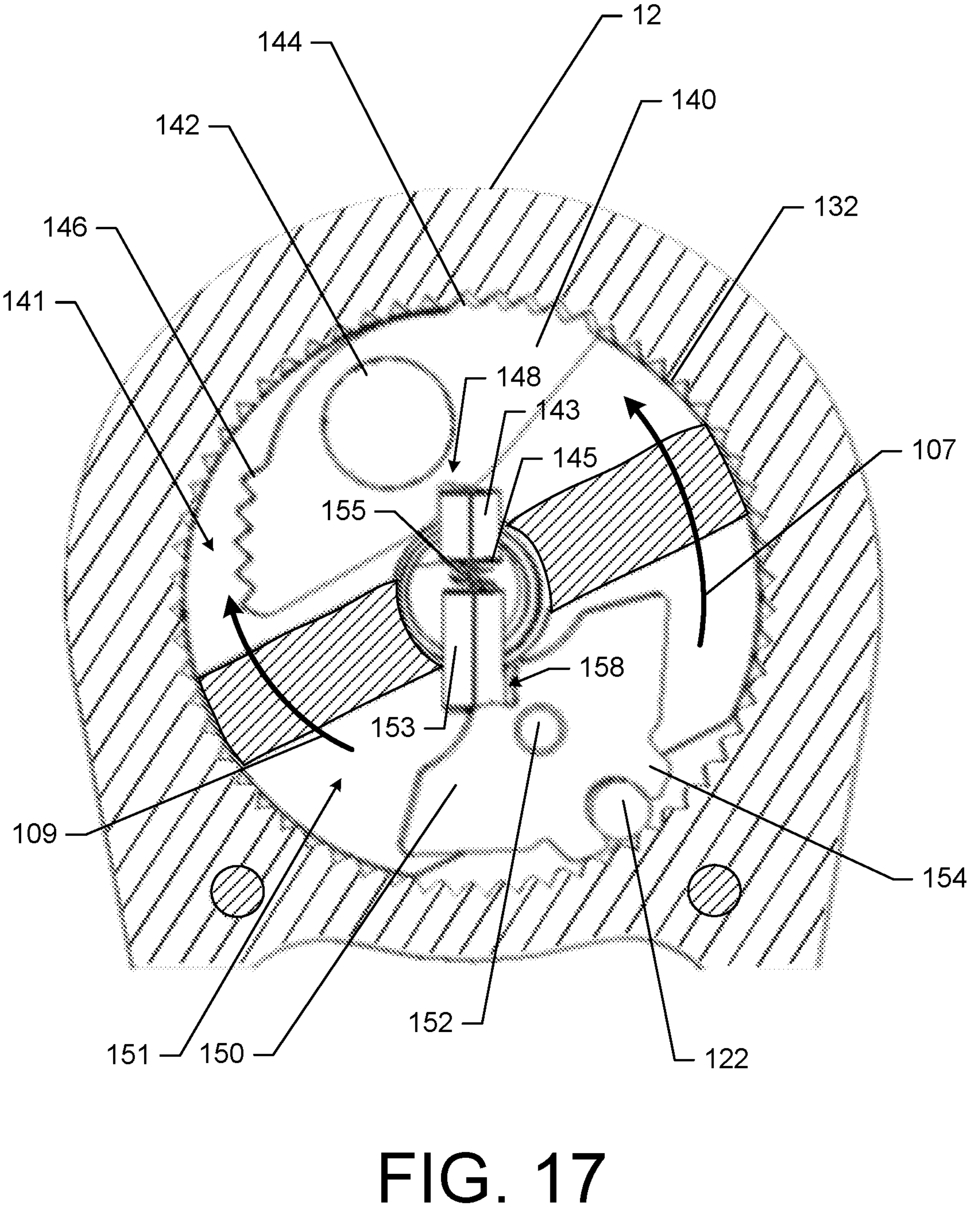
Figure 18:
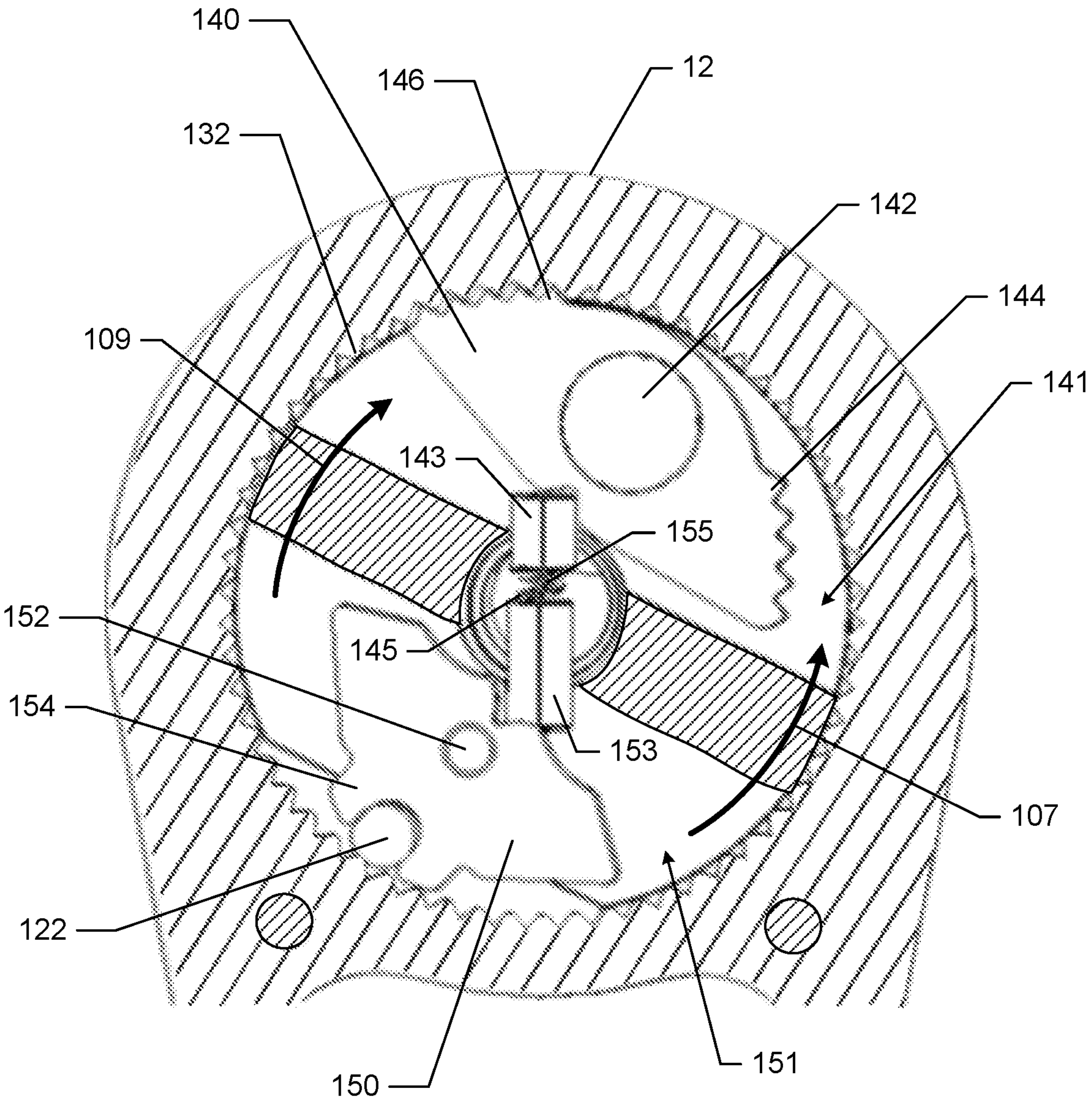
Figure 19:
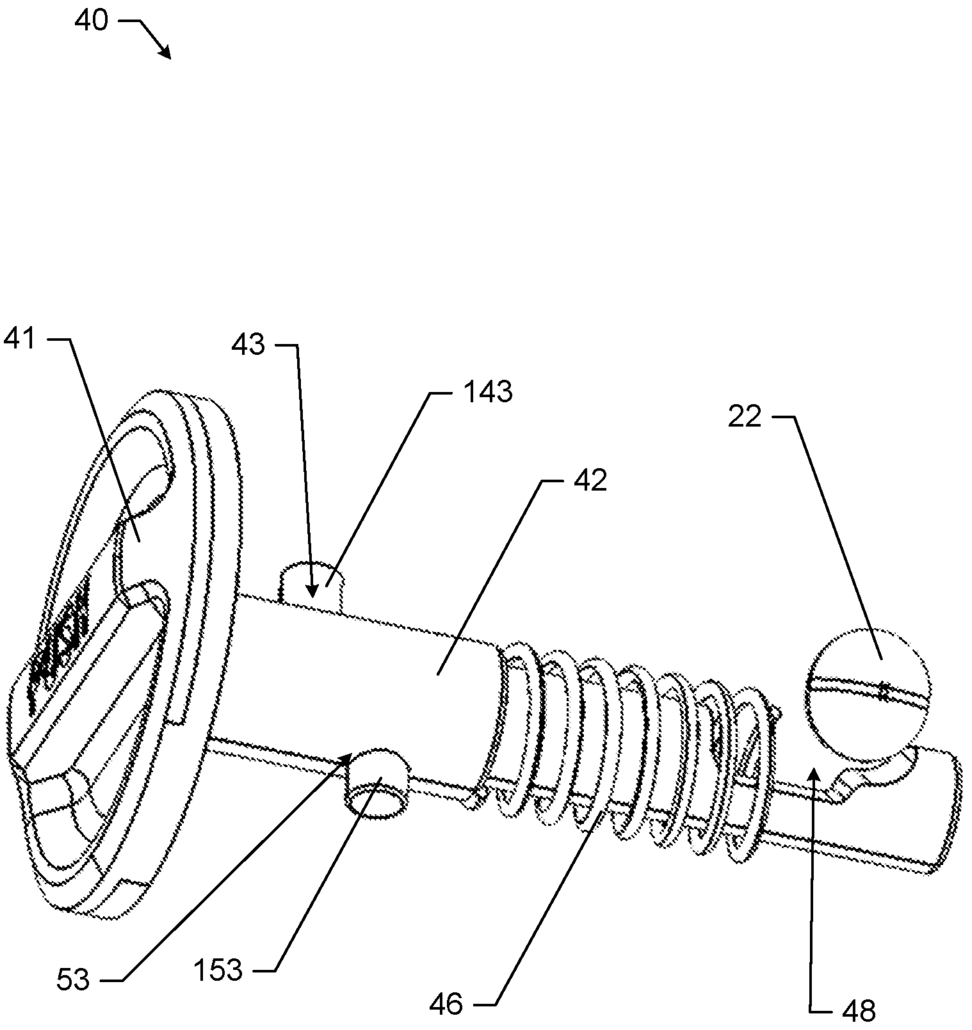
Figure 20:
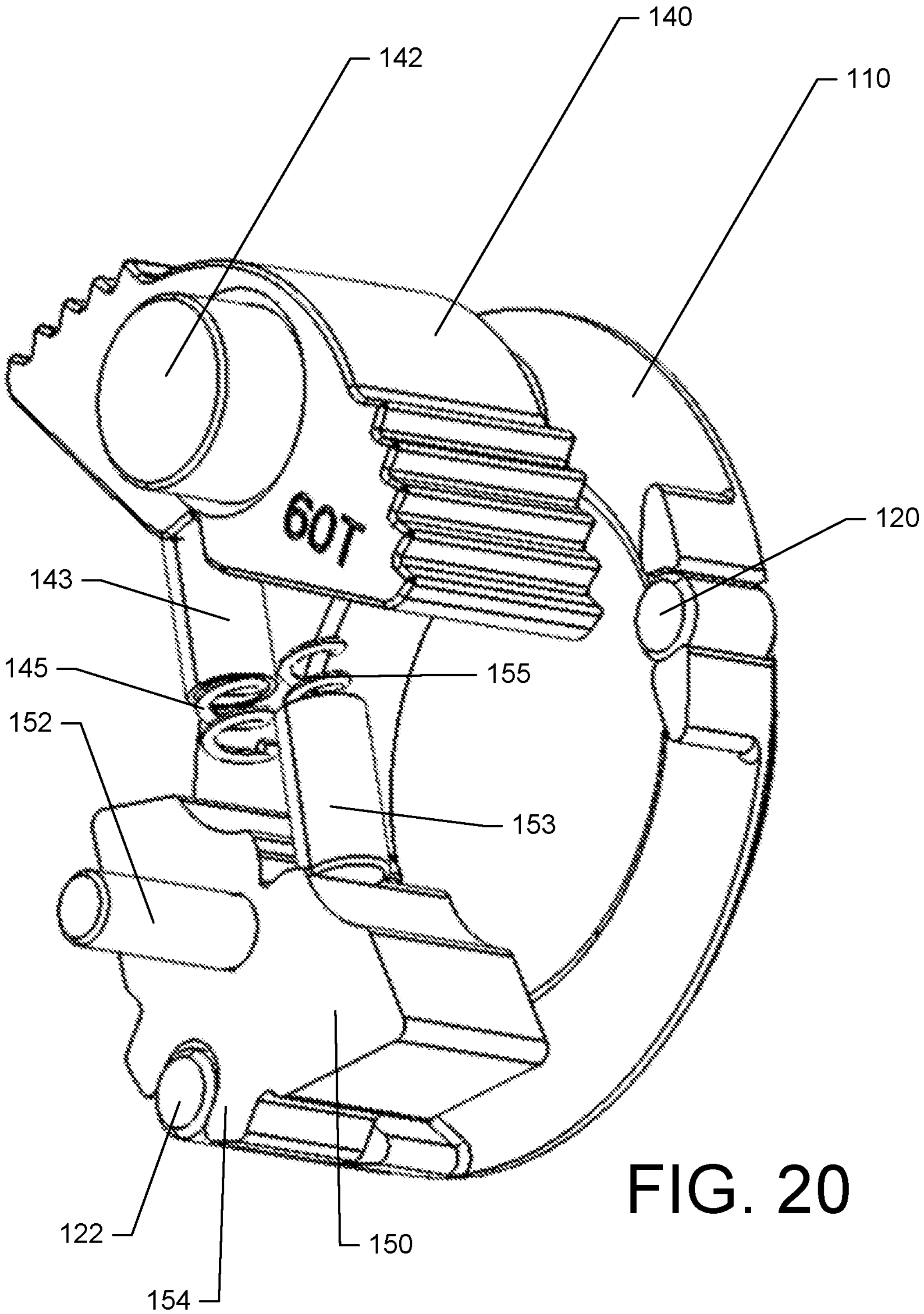
Figure 21:
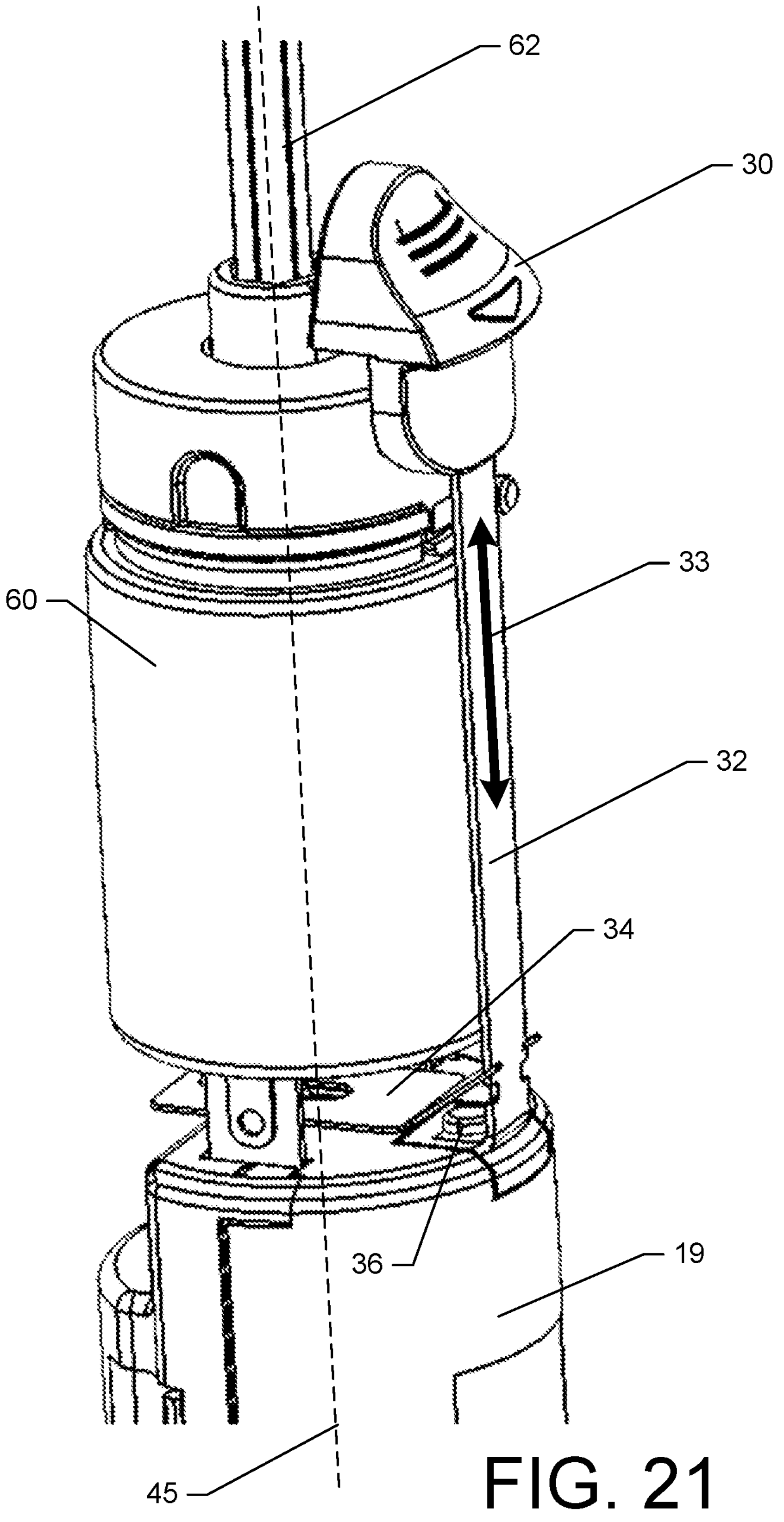

Having thus described some example embodiments in general terms, reference will now be made to the accompanying drawings, which are not necessarily drawn to scale, and wherein:

FIG. 1 illustrates a perspective front view of a ratchet wrench in accordance with an example embodiment;

FIG. 2 illustrates a perspective rear view of a ratchet wrench in accordance with an example embodiment;

FIG. 3 illustrates an exploded view of a ratchet wrench in accordance with an example embodiment;

FIG. 4A illustrates a structural block diagram of a ratchet wrench in accordance with an example embodiment;

FIG. 4B illustrates a side view of a head and neck of a ratchet wrench in accordance with an example embodiment;

FIG. 5 illustrates an exploded view of select components of a ratcheting mechanism of a ratchet wrench in accordance with an example embodiment;

FIG. 6 illustrates partially exploded view of a head and neck of a ratchet wrench in accordance with an example embodiment;

FIG. 7 illustrates a portion of a ratcheting mechanism of ratchet wrench including a body in accordance with an example embodiment;

FIG. 8 illustrates a portion of a ratcheting mechanism of ratchet wrench including a body separated from a yoke in accordance with an example embodiment;

FIG. 9 illustrates a yoke separated from a pin ring in accordance with an example embodiment;

FIG. 10 illustrates a front view of a yoke and a pin ring in accordance with an example embodiment;

FIG. 11 illustrates a perspective rear view of a yoke and a pin ring in accordance with an example embodiment;

FIG. 12 illustrates a perspective side view of a body of a ratchet wrench in accordance with an example embodiment;

FIG. 13 illustrates another perspective side view of a body of a ratchet wrench in accordance with an example embodiment;

FIG. 14 illustrates front view of a body of a ratchet wrench in accordance with an example embodiment;

FIG. 15 illustrates ratchet pawl of a ratchet wrench in accordance with an example embodiment;

FIG. 16 illustrates a cross-section front view of a ratchet wrench taken at A-A of FIG. 4B showing engagement between drive pins and drive edges of a body in accordance with an example embodiment;

FIG. 17 illustrates a cross-section front view of a ratchet wrench taken at B-B of FIG. 4B showing a ratchet pawl and a selector member to facilitate fastener turning in a first direction in accordance with an example embodiment;

FIG. 18 illustrates a cross-section front view of a ratchet wrench showing a ratchet pawl and a selector member to facilitate fastener turning in a second direction in accordance with an example embodiment;

FIG. 19 illustrates a selector switch of a ratchet wrench in accordance with an example embodiment;

FIG. 20 illustrates ratchet pawl and a selector member coupled to a pin ring in accordance with an example embodiment; and FIG. 21 illustrates an internal portion of a handle of a ratchet wrench in accordance with an example embodiment.

DETAILED DESCRIPTION OF SOME EXAMPLE EMBODIMENTS

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. As used herein, operable coupling should be understood to relate to direct or indirect connection that, in either case, enables functional interconnection of components that are operably coupled to each other.

According to some example embodiments, a ratcheting assembly is provided that can utilize a toothless drive ring and movable drive pins that are engaged between an internal surface of the toothless drive ring and drive edges of an internal ratchet wrench body as a drive mechanism for a ratchet wrench or ratchet wrench assembly. The toothless drive ring and the drive pins may be implemented either in a powered ratcheting wrench or in a hand-turn only ratcheting wrench. In this regard, example embodiments are described in the context of a powered ratcheting wrench which is capable of readily transitioning between a motorized-turning mode and a hand-turning mode. As such, example embodiments that are implemented as a hand-turn only mode may include a toothless drive ring that is maintained in a fixed rotational position relative to a head of the ratchet wrench. With respect to a powered implementation, an example ratchet wrench or ratchet wrench assembly may operate in either a motorized-turning mode (e.g., for low torque turning of a fastener) and also in a hand-turning mode (e.g., for high torque turning of a fastener). The motorized-turning mode may operate to increase the efficiency of installing a fastener prior to final tightening in a hand-turn mode or removing a fastener after initially loosening a fastener using the hand-turn mode. Both the motorized-turning mode and the hand-turning mode may leverage a shared ratcheting mechanism and these modes may be transitioned between intuitively. The powered-turning mode may be implemented by, for example, simply depressing a motor operation button to activate a motor to turn the drive tang. The hand-turning mode may be implemented by simply hand-turning a handle of the ratchet wrench to turn the drive tang and ratchet back. Additionally, the ratchet wrench assembly may include a selector switch that may be actuated to change the direction of ratcheting and transition the ratchet wrench between tightening or loosening.

According to some example embodiments, an example ratchet wrench 10 (also referred to as a ratcheting wrench assembly) is shown in FIG. 1, which provides a perspective front view of the ratchet wrench 10. In this regard, the ratchet wrench 10 may comprise a head 12, a neck 14, and a handle 16. As further described below, the head 12 of the ratchet wrench 10 may house a ratcheting mechanism that is configured to support both motorized-turn and hand-turn ratcheting. The ratcheting mechanism may be disposed within a cavity in the head 12 and the ratcheting mechanism may be held within the head 12 and protected from dust and debris by a cover plate 24 that may be affixed to the head 12 by fasteners 26.

The neck 14 of the ratchet wrench 10 may be an interface segment coupled between the head 12 and the handle 16. The handle 16, according to some example embodiments, is typically narrower than the head 12 and handle 16. According to some example embodiments, the head 12 and the neck 14 may be formed as a single, integrated component (e.g., steel component). As described in further detail below, the neck 14 may include an internal bore that houses a drive shaft that is rotated by a motor to support the motorized-turning mode.

The handle 16 may be coupled to the neck 14 and extend away from the head 12 to provide turning leverage for a user that is grasping the handle 16. The handle 16 may be shaped and sized for a user's hand. According to some example embodiments, the handle 16 may be cylindrical in shape and may include an internal cavity for housing, for example, electronic components such as a battery and motor, as further described below. The cavity in the handle 16 may be accessible via a cap 18, which may be removably coupled to the handle 16 via, for example, corresponding threading.

As shown in FIG. 1, a drive tang 20 (also referred to as a fastener drive member) may extend from a front face of the head 12 of the ratchet wrench 10. The drive tang 20 may be shaped (e.g., square shaped) to receive a fastening member, such as, for example, a socket. The drive tang 20 may be received into a rear opening in the socket and the socket may be configured to provide an interface at a front of the socket (e.g., via a front opening) for coupling the ratchet wrench 10 to a fastener (e.g., a nut, a bolt, a screw, or the like). According to some example embodiments, a detent bearing 22 may be disposed within the drive tang 20 to assist with retaining the fastening member on the drive tang 20. In the hand-turn mode, the drive tang 20 may be configured to rotate relative to the head 12 about an axis of rotation 25 for the ratchet wrench 10 as indicated by the arrow 35 in a ratcheting direction and be prevented from moving relative to the head 12 in a driving direction to turn the fastener. In the motorized-turning mode, the drive tang 20 may be configured to rotate in a driving direction to turn the fastener but not rotate in a ratcheting direction.

FIG. 2 illustrates a perspective rear-view of the ratchet wrench 10 which illustrates additional features on the rear-side of the head 12 and the handle 16. In this regard, selector switch 40 is shown on a rear face of the head 12. As further described below, the selector switch 40 may be configured to allow a user rotate the selector switch 40, as indicated by arrow 65, to place the ratchet wrench 10 in a tightening mode or a loosening mode. Additionally, the selector switch 40 may be depressible and to control the operation of the detent bearing 22 to either lock a fastening member to the drive tang 20 or allow a fastening member to be released from the drive tang 20.

Additionally, a motor operation button 30 is shown as being disposed on a rear side of the handle 16. In this regard, because the handle 16 may be wider than the neck 14, the neck 14 (or the handle 16) may include a curved transition region 15. The motor operation button 30 may be designed to be flush with the curvature of the transition region 15 to limit or prevent inadvertent actuation of the motor operation button 30. A central handle axis 45 for the ratchet wrench 10 may be defined that passes centrally through the handle 16 and the neck 14. According to some example embodiments, the motor operation button 30 may be configured to actuate downward in accordance with the arrow 55 to activate motor turning and return upward in an opposite movement direction to discontinue motor operation. As such, actuation of the motor operation button 30 may occur in the direction of arrow 55 which may be parallel to the central handle axis 45.

FIG. 3 shows an exploded, perspective view of the ratchet wrench 10. In this regard, according to some example embodiments, the motor-turning mode of operation may be powered by an on-board battery 19. The battery 19 may be housed in a cavity in the handle 16 and may be removable and replaceable by accessing the cavity by removing the cap 18. The battery 19 may any type of battery such as, for example, a rechargeable battery (e.g., a lithium ion battery). The battery 19 may include contacts that electrically couple to circuitry within the handle 16 to provide electrical power to the circuitry.

FIG. 4A illustrates a conceptual block diagram of the ratchet wrench 10, and example components of which will be described in additional detail thereafter and otherwise herein. In this regard, as indicated above, the ratchet wrench 10 may include a head 12, a neck 14, and a handle 16. Within the head 12, a ratchet mechanism 50 may be housed that provides for rotation of the drive tang 20. The direction of ratcheting of the ratchet wrench 10 may be controlled via actuation of the selector switch 40.

In a motorized-turn mode, a motor 60 in the handle 16 may turn a drive shaft 62 that operably couples with the ratchet mechanism 50 to cause turning of the drive tang 20. The motor 60 may be a DC motor. According to some example embodiments, the motor 60 may be configured to turn at relatively high rotations per minute at a relatively low torque.

The motor 60 may be controlled by electronic circuitry 70, which may be electrically connected to the motor 60. The electronic circuitry 70 may include active and/or passive electronic components configured to perform the functionalities described with respect to the electronic circuitry 70. In this regard, the electronic circuitry 70 may include switches, transistors, controllers (e.g., in the form of a processor, application specific integrated circuit (ASIC), field programmable gate array (FPGA), or the like), capacitors, resistors, or the like.

According to some example embodiments, the electronic circuitry 70 may include a switch 36 that may be closed via actuation of the motor operation button 30. In this regard, the motor operation button 30 may be operably coupled to a button extension 32 that may be formed as a rigid, elongated member. The button extension 32 may be configured to operably couple to a leaf spring 34 to bias the button extension 32 and the motor operation button 30 in an upward position, where the leaf spring 34 is not in physical contact with the switch 36. However, when a user depresses the motor operation button 30, the button extension 32 may also be actuated, which depresses the leaf spring 34 into the switch 36 to close the switch 36. In response to the switch 36 closing, the electronic circuitry 70 may be configured to cause the motor 60 to turn the drive shaft 62.

The electronic circuitry 70 may also be electrically coupled to the battery 19. As such the battery 19 may provide electrical power to the electronic circuitry 70. The electronic circuitry 70 may be configured to control power transfer from the battery 19 to the motor 60 in response to closing of the switch 36. Additionally, the electronic circuitry 70 may be configured to control power transfer from the battery 19 to the motor 60 based on additional criteria. In this regard, the electronic circuitry 70 may be configured to monitor the current being drawn by the motor 60. As torque on the motor 60 increases (e.g., due to a fastener being tightened by the ratchet wrench 10), the electric current drawn by the motor 60 may also increase. According to some example embodiments, the electronic circuitry 70 may be configured to interrupt electric power transfer to the motor 60 in response to the electric current being drawn by the motor 60 exceeding a threshold current. Accordingly, when torque on a fastener reaches a corresponding torque threshold, the motor 60 may be stopped to prevent further turning of the fastener.

The electronic circuitry 70 may be configured to monitor the electric current being drawn by the motor 60 (because the motor operation button 30 is also depressed) by measuring the voltage across the terminals of the motor 60. Alternatively, the voltage across a resistor in parallel with the terminals of the motor 60 may be monitored using, for example, a processor configured monitor voltages and compare the value of the measure voltage to a predefined threshold. As the voltage drops, the current drawn by the motor 60 may increase. Further, the electronic circuitry 70 may include for example a controllable switch in the form of a transistor (e.g., a bipolar, field effect, or the like). Power to the motor 60 may pass through the transistor and be controlled by a signal on the gate terminal of the transistor. In this regard, when the current or voltage exceeds a predetermined threshold a signal on a transistor gate may be controlled to interrupt power to the motor 60. As such, the electronic circuitry 70 may be configured to monitor an electrical current to the motor 60 and interrupt the electrical current to the motor 60 in response to the electrical current to the motor 60 exceeding a threshold current.

According to some example embodiments, by avoiding high current conditions, battery life may be extended, particularly with respect to the number of fasteners that can be, for example, installed on a single battery charge. As such, according to some example embodiments, by implementing such a current threshold/motor turn-off technique many more fasteners may be installed relative to an implementation where the current is permitted to exceed the threshold.

Due to the inclusion of the battery 19, the ratchet wrench 10 may be a cordless tool. However, according to some example embodiments, rather than, or in addition to the battery 19, the ratchet wrench 10 may be corded and obtain power from an AC power outlet or the like. Additionally, according to some example embodiments, rather than being sourced by electrical power, the ratchet wrench 10 may be powered pneumatically. In such example embodiments, the motor 60 may be a pneumatic motor that translates air pressure into rotational movement for delivery to the ratchet mechanism 50.

FIG. 4B illustrates a side view of an upper portion of the ratchet wrench 10 comprising the head 12 and the neck 14. As shown, the drive tang 20 extends forward from the head 12 and the selector switch 40 may be disposed on a rear side of the head 12.

The construction and operation of the ratcheting mechanism 50 will now be described with reference to FIGS. 5 through 20. With respect to FIG. 5, an exploded view of select components of an example ratcheting mechanism of a ratchet wrench 10 are shown. In this regard, the head 12 is shown with an internal head cavity 13. Within the head cavity 13, a ratchet gear 130 is disposed having gear teeth 132. The gear 130 may be integrated into the head 12 such that the ratchet gear 130 and the gear teeth 132 are part of a single molded head 12. The gear teeth 132 may be disposed on an inner surface of the gear 130, such that the gear teeth 132 extend towards the axis of rotation 25 (not shown in FIG. 5).

The assembly shown in FIG. 5 may also include a bushing drive member 160 and a drive busing 164. The bushing drive member 160 may be rotated by the drive shaft 62. The bushing drive member 160 may include a cavity for receiving an end of the drive shaft 62. In this regard, according to some example embodiments, the cavity in the bushing drive member 160 for receiving the drive shaft 62 may be keyed to fit with the drive shaft 62 in a manner that causes the bushing drive member 160 to rotate when the drive shaft 62 rotates. The bushing drive member 160 may also include a bushing drive projection 162. The bushing drive projection 162 may be formed as a post that is offset from the center of the rotation of the bushing drive member 160. As such, when the bushing drive member 160 is rotated by the drive shaft 62, the bushing drive projection 162 may orbit in a circular motion around the axis of rotation of the drive shaft 62. The drive bushing 164 may have a round shape (e.g., ball shape) with a cavity that may receive the bushing drive projection 162. As such, the drive bushing 164 may also orbit in a circular motion around the axis of rotation of the drive shaft 62. According to some example embodiments, a motor assembly may be defined that comprises the motor 60, the drive shaft 62, the bushing drive member 160, and the drive bushing 164.

The assembly shown in FIG. 5 may also include a yoke 100. The yoke 100 may include a yoke ring 102 and a drive bushing receptacle 106. The yoke ring 102 (which may also be referred to as a drive ring) may include a toothless inner surface 104. In this regard, the inner surface 104 of the yoke ring 102 may be substantially smooth. The drive bushing receptacle 106 may be affixed to the yoke ring 102. The drive bushing receptacle 106 may be formed by two opposing arcuate legs that extend from the yoke ring 102 to form a curved slot. As further described below, the drive bushing receptacle 106 may be sized to fit the drive bushing 162 into the slot of the drive bushing receptacle 106.

The assembly shown in FIG. 5 may also include a pin ring 110 and one or more drive pins, in this case a plurality of drive pins. In the example embodiments described herein, three drive pins may make up the plurality of drive pins, but one of skill in the art would appreciate that two or more drive pins may be utilized according to some example embodiments. The pin ring 110 may include a respective slot for receiving each of the drive pins within the plurality of drive pins. With each of the drive pins installed in a respective slot of the pin ring 110, the drive pins may be forced to move in unison when the pin ring 110 rotates. The plurality of drive pins (which may include a first drive pin) may include a control drive pin 122 and one or more follower drive pins 120. The control drive pin 122 may be longer than the follower drive pins 120 and the increased length of the control drive pin 122 may enable to the control drive pin 122 to control the movement of the pin ring 110 and thus the follower drive pins 120.

The assembly shown in FIG. 5 also includes, according to some example embodiments, a body 80. The body 80 may include a number features that couple various components of the ratchet wrench 10 to the body 80. The body 80 may include separate cavities for receiving a ratchet pawl 140, a selector member 150, a selector post 42 with a detent spring 46, and a detent bearing 22. Additionally, the drive tang 20 may extend from a forward end of the body 80. Moving from the forward end of the body 80 to the rear end of the body 80, the body 80 may include a drive plate 82 behind the drive tang 20, followed by separate, opposing side cavities for the ratchet pawl 140 and the selector member 150. At the rear end of the body 80, a rear cavity extending along the axis of the rotation 25 of the ratchet wrench 10 is provided for receiving the selector post 42 which extends from the selector switch 40 and the detent spring 46. The ratchet pawl 140 may be pivotally affixed to the body 80 via a pawl pin 142 and the selector member 150 may be pivotally affixed to the body 80 via the selector member pin 152.

Since the selector member 150 may be pivotally affixed to the body 80 via the selector member pin 152, the selector member 150 may rotate together with the body 80 and the drive tang 20 about the axis 25. The selector member 150 also includes a control drive pin receptacle 154 that is formed as a slot between two legs of the selector member 150. The control drive pin 122 may be received within the control drive pin receptacle 154. As such, since the control drive pin 122 is received in the control drive pin receptacle 154 of the selector member 150, the control drive pin 122 may also rotate with the body 80 and the drive tang 20 about the axis 25 with the selector member 150. Further, since the control drive pin 122 may also be disposed in a respective slot of the pin ring 110, the pin ring 110 and the follower drive pins 120, disposed in respect slots of the pin ring 110, may also rotate together with body 80 and the drive tang 20 about the axis 25. Additionally, since the ratchet pawl 140 is affixed to the body 80 via the pawl pin 142, the ratchet pawl 140 may also rotate together with the body 80 and the drive tang 20 about the axis 25.

Referring now to FIG. 6, a partially exploded view of the head 12 and neck 14 of the ratchet wrench 10 is shown in reference to axis 25. In this regard, the ratcheting mechanism is removed from the head 12. Further, the drive shaft 62 is shown as being removed from the neck cavity 63. As can be seen in additional detail, the bushing drive member 160 with the drive bushing 162 is installed in the drive bushing receptacle 106 of the yoke 100. Due to the offset of the drive bushing 162 and the resulting circular orbital movement of the drive bushing 162, drive bushing 162 may cause the yoke 100 to reciprocate or repeatedly pivot about the axis 25 with each rotation of the drive bushing 162 and the drive bushing 164 may slide forward and backward within the slot formed by the drive bushing receptacle 106 with each rotation of the drive bushing 162. As such, the circular orbital movement of the drive bushing 162 may be translated into planar reciprocating movement of the yoke 100 due to the interaction between the drive bushing 162 and the drive bushing receptacle 106.

Additionally, as shown in FIG. 6, the pin ring 110 may be disposed within the yoke ring 102 with each of the drive pins (i.e., control drive pin 122 and follower drive pins 120) disposed in a respective slot in the pin ring 110. As such, the drive pins may be confined in a respective space formed by a slot in the pin ring 110 and the inner surface 104 of the yoke ring 102. Further, the pin ring 110 may be disposed around the body 80 such that the drive tang 20 extends through a central opening in the pin ring 110 and the yoke ring 102.

FIG. 7 shows a perspective side view of the body 80, the yoke 100, and the pin ring 110 in an assembled configuration in isolation from other components of the ratchet wrench 10 in reference to axis 25 according to some example embodiments. In this regard, similar to FIG. 6, the yoke 100 is shown with the pin ring 110 installed within the inner opening of the yoke ring 102. The drive pins 122, 120 are also shown as each being disposed within a respective slot of the pin ring 110 and in contact with the inner surface (i.e., the toothless, substantially smooth inner surface) of the yoke ring 102. The pin ring 110 is disposed around a portion of the body 80 with the drive tang 20 extending forward of the pin ring 110. The ratchet pawl 140 is also shown disposed within the ratchet pawl side cavity of the body behind the pin ring 110 and the yoke ring 102.

FIG. 8 shows a perspective view of the assembly of FIG. 7 in reference to axis 25, with the pin ring 110 and yoke 100 removed from the body 80. As shown in FIG. 8, the pin ring 110 with the drive pins may be seated on a drive plate 82 of the body 80. The drive plate 82 may include one or more drive edges (including a first drive edge) where each drive edge 84 is positioned to engage one of the drive pins 122, 120. As further described below, the drive pins 122, 120 may be held in position by the pin ring 110 such that the drive pins 122, 120 move together when the pin ring 110 rotates, and the drive pins 122, 120 may also be disposed between the respective drive edges 84 and the inner surface 104 of the yoke ring 102.

Additionally, the gear-engaging front face of the ratchet pawl 140 is shown in FIG. 8. In this regard, the ratchet pawl 140 may include first ratchet teeth 144 (including a first ratchet tooth) and second ratchet teeth 146 (including a second ratchet tooth). The front face of the ratchet pawl 140 may be convex to facilitate engagement with the gear teeth 132 on the inner surface of the head cavity 13. As further described below, the ratchet pawl 140 may be configured to pivot within the side pawl cavity of the body 80 in response to movement of the selector switch 40 between a fastener tightening position and a fastener loosening position.

FIG. 9 provides a perspective view of the yoke 100 with the pin ring 110 removed in reference to axis 25, according to some example embodiments. In this regard, as mentioned above, the pin ring 110 may be disposed within a central opening of the yoke ring 102. According to some example embodiments, the pin ring 110 need not physically contact the inner surface 104 of the yoke ring 102. Rather, the drive pins 122, 120 may physically contact the inner surface 104 of the yoke ring 102 and the walls of the respective slots in the pin ring 110.

FIG. 10 shows a front view of the yoke 100 and the pin ring 110 in an assembled configuration according to some example embodiments. In this regard, with reference to FIG. 10, control drive pin 122 and the follower drive pins 120 may be in physical contact with the inner surface 104 of the yoke ring 102. Additionally, since the example embodiment shown in FIG. 10 includes three drive pins, according to some example embodiments, the drive pins may be disposed at positions around an outer circumference of the pin ring 110 such that each drive pin is disposed at the same distance away from the two adjacent drive pins. In this regard, according to some example embodiments, the drive pins may be disposed at about 120 degrees apart from each other around the pin ring 110 with respect to an origin placed at a center of the central opening in the pin ring 110.

Similar to FIG. 10, FIG. 11 shows a perspective rear view of the yoke 100 and the pin ring 110 in an assembled configuration according to some example embodiments. As can be clearly seen in FIG. 11, the control drive pin 122 has a longer length than the follower drive pins 120. The extended portion of the control drive pin 122 may be configured to engage with the selector member 150 such that when the selector member 150 moves, the control drive pin 122 also moves. Movement of the control drive pin 122 in turn may cause the pin ring 110 to rotate within the yoke ring 102 and cause the follower drive pins 120 to move accordingly.

FIGS. 12 and 13 show a perspective side views of the body 80 in isolation from other components of the ratchet wrench 10 according to some example embodiments. In this regard, the body 80 may include drive tang 20, the drive plate 82, the side pawl cavity 141 and the side selector member cavity 151. The drive tang 20 may also include a detent bearing opening 23 that may be sized to permit the detent bearing 22 to extend out of the detent bearing opening 23, without permitting the detent bearing 22 from passing through the detent bearing opening 23. The drive plate 82 with the drive edges 84 are also shown.

FIG. 14 provides a front view of the body 80 according to some example embodiments. The structure of the drive plate 82 can be best seen in FIG. 14. As mentioned above, the drive plate 82 may be a feature on the body 80 that includes one or more drive edges 84, in this case a plurality of drive edges 84. According to some example embodiments, the drive edges 84 may be linear or substantially linear. However, according to some example embodiments, the drive edges 84 may take on different edge profiles such as, for example, the drive edges 84 may be substantially arcuate (concave or convex) or curved. According to some example embodiments, since the ratchet wrench 10 may, for example, have three drive pins, the drive plate 82 may have three drive edges 84 that form a triangular shape. The drive edges 84 may extend between the edges of the rear circumference of the body 80. As indicated in FIG. 14, if the drive edges 84 were extended beyond the edges of the rear circumference of the body 80, the drive edges 84 may form a triangular shape in the form of, for example, an equilateral triangle. However, because the drive edges 84 do not extend, the drive plate 82 may include rounded edges 87 in between each of the drive edges 84.

FIG. 15 shows a side view of the ratchet pawl 140 of the ratchet wrench 10. In this regard, the ratchet pawl 140 may have a generally convex front face with first ratchet teeth 144 (including a first ratchet tooth) disposed at a first end of the front face and second ratchet teeth 146 (including a second ratchet tooth) disposed at a second end of the front face of the ratchet pawl 140. The first ratchet teeth 144 and the second ratchet teeth 146 may be structured to engage with the gear teeth 132. As such, the first ratchet teeth 144 may have a convex curvature that is complementary to a concave curvature of the gear teeth 132 and the second ratchet teeth 146 may have a convex curvature that is complementary to the concave curvature of the gear teeth 132.

Further, the ratchet pawl 140 may also include pin opening 148 that is configured to receive the pawl pin 142 to pivotally affix the ratchet pawl 140 within the side pawl cavity 141 of the body 80. As such, the ratchet pawl 140 may pivot about the pawl pin 142 in response to movement of a pawl control member 143 within the pawl control notch 148. Additionally, the angles of the walls of the pawl control notch 148 may be disposed in association with the positioning of the first ratchet teeth 144 and the second ratchet teeth 146 to position the ratchet pawl 140 in a tightening/forward or loosening/reverse position and permit the ratchet pawl 140 to slightly pivot or rock against the pawl control member 143, which may be spring biased against a wall of the pawl control notch 148 to facilitate a ratcheting function with respect to the gear teeth 132. During the ratcheting, depending on the position of the ratchet pawl 140, either the first ratchet teeth 144 or the second ratchet teeth 146 may maintain physical contact with the gear teeth 132. In this regard, based on the positioning of the ratchet pawl 140 and whether the first ratchet teeth 144 or the second ratchet teeth 146 are engaged with the gear teeth 132, a fastener turning rotational direction and a fastener stationary rotational direction may be defined for the ratchet wrench 10 as further described below.

Having shown and described the various features of the drive pins, drive edges 84, yoke ring 102, and the ratchet pawl 140, FIG. 16 shows a cross-section front view of the ratchet wrench 10 according to some example embodiments depicting an engagement between the drive pins 122, 120, the drive edges 84, and the inner surface 104 of the yoke ring 102 to describe the functional operation of the ratcheting mechanism. In this regard, FIG. 17 shows the associated engagement of the ratchet pawl 140 with the gear teeth 132 according to some example embodiments.

As described above, the drive bushing 162 may be configured to circularly orbit the axis of rotation of the drive shaft 62, which may also be the central handle axis 45, due to being offset from the axis 45 by the bushing drive member 160. Due to the sliding and rotational engagement between the drive bushing 162 and the drive bushing receptacle 106 of the yoke 100, the circular orbit movement of the drive bushing 162 may be translated into reciprocating, planar movement yoke 100 and the yoke ring 102 as indicated by arrows 107 and 109. In the positional context of the components shown in FIGS. 16 and 17, the rotational direction 107 (counter-clockwise) is a fastener turning direction and the rotational direction 109 (clockwise) is a fastener stationary direction.

The drive pins 122, 120 may be disposed in respective circular segment regions 85 (also referred to as drive pin cavities) formed by the inner surface 104 of the yoke ring 102 (forming the curved edge of the circular segment region) and the drive edge 84 (forming a chord of the circular segment region). As further described below, the drive pins 122, 120 may be moveable within these respective circular segment regions 85 in response to actuation of the selector switch 40 to move the selector member 150 and the control drive pin 122. Since the follower drive pins 120 are coupled to the control drive pin 122 via the pin ring 110, the follower drive pins 120 also move in response to movement of the control drive pin 122 by the selector member 150. As such, the drive pins 122, 120 may be positioned within the circular segment regions 85 between and in physical contact with the both a drive edge 84 and the inner surface 104 of the yoke ring 102 adjacent one of the narrowing ends of the circular segment regions 85.

Due to the positioning of the drive pins 122, 120 in physical contact with the yoke ring 102 and the drive plate 82 via the drive edges 84, movement of the yoke ring 102 may be translated through the drive pins 122, 120 to the drive edges 84 to rotate the drive plate 82 when the yoke ring 102 is rotated, for example, in a first rotational direction. Since the drive plate 82 and the drive tang 20 may be integrated components of the body 80, the drive plate 82 and the drive tang 20 may therefore rotate together. Additionally, since the ratchet pawl 140 is affixed to the body 80, the ratchet pawl 140 may perform a ratcheting function in response to rotation of the body 80 relative to the head 12 due to engagement of the teeth of the ratchet pawl 140 with the gear teeth 132.

More specifically, due to the shape of the circular segment regions 85 and the placement of the drive pins 122, 120 within the circular segment regions 85 (due to the positioning of the selector switch 40 as further described below), the movement of the yoke ring 102 in a first rotational direction may cause compression on the drive pins 122, 120 between the inner surface 104 of the yoke ring 102 and the drive edges 84. The compression force may be due to the drive pins 122, 120 being urged into a narrower end of the circular segment region 85. Due to this compression force, the movement of the yoke ring 102 in the first rotational direction may cause rotational movement of the drive plate 82 in the first rotational direction and associated ratcheting of the ratchet pawl 140 due to the corresponding positioning of the ratchet pawl 140 in response to the position of the selector switch 40. Accordingly, no relative movement may occur between the yoke ring 102 and the drive tang 20 in the first rotational direction (i.e., the yoke ring 102 and the drive tang 20 rotate together) as described above due to the interaction with the drive pins 122, 120.

However, when the yoke ring 102 moves in a second rotational direction (opposite to the first rotational direction) due to the reciprocating motion of the yoke 100, the drive pins 122, 120 may not be under a compression force, because the drive pins 122, 120 are not being urged into the into the narrower ends of the circular segment regions 85. As such, the movement of the yoke ring 102 in the second rotational direction is not translated to the drive plate 82 and thus the yoke ring 102 may rotate in the second rotational direction while the drive plate 82 (and the drive tang 20) remain stationary. Additionally, due to the positioning of the ratchet pawl 140, the teeth of ratchet pawl 140 may engage with the gear teeth 132 such that relative rotation of the ratchet pawl 140 and thus the body 80 and drive plate 82 are prevented in the second rotational direction by the ratchet pawl 140. As such, due to the non-ratcheting engagement of the teeth of the ratchet pawl 140 with the gear teeth 132, the body 80 is prevented from moving relative to the head 12 when the yoke 100 and the yoke ring 102 rotate in the second rotational direction (i.e., the yoke ring 102 and the drive tang 20 do not rotate together).

Having generally described the interaction between the yoke ring 102, the drive pins 122, 120, and the drive edges 84, the following provides a more specific description of the operation of the ratchet wrench 10 with reference to the specific positioning of the drive pins 122, 120 in the circular segments 85, the ratchet pawl 140, and the rotation directions indicated by arrows 107 and 109 as shown in FIGS. 16 and 17. In this regard, the drive pins 122, 120 are positioned on a left (as viewed from the axis of rotation 25), counter-clockwise side of the circular segment regions 85 due to positioning of the selector switch 40, and the drive pins 122, 120 are constrained in these positions by the slots that the drive pins 122, 120 reside within of the pin ring 110. As further described below, the pin ring 110 and the follower drive pins 120 may be held in a stationary position relative to the drive plate 82 due to the operation of the selector member 150 in association with the control drive pin 122.

In this regard, when the yoke 100 and the yoke ring 102 rotate in the rotational direction 107 (e.g., the first rotational direction), the drive pins 122, 120 are urged towards the narrowing end of the circular segment regions 85 and may be compressed between the drive edges 84 and the inner surface of the yoke ring 102. Due to this compression force and corresponding static frictional force between each of the drive pins 122, 120, the inner surface of the yoke ring 102 and the drive edges 84, the drive pins 122, 120 and the drive edges 84 may rotate with the yoke ring 102 in the rotational direction 107. As such, the drive plate 82 may be turned in the rotational direction 107 and the drive tang 20 may also rotate in the direction 107.

As shown in FIG. 17, the ratchet pawl 140 may also ratchet across the gear teeth 132 when the drive plate 82, and thus the body 80 and the ratchet pawl 140, rotate in the direction 107 due to the positioning of the first ratchet teeth 144 and the spring bias applied to the ratchet pawl 140 by the spring 145. In this regard, FIG. 17 provides another cross-section front view of the head 12 and components of the ratcheting mechanism of ratchet wrench 10 in the configuration shown in FIG. 16 at a depth that illustrates positioning of the ratchet pawl 140 within the side pawl cavity 141 and the selector member 150 within the side selector member cavity 151. As shown, the pawl control member 143 (which may be spring loaded via pawl spring 145) is positioned within the pawl control notch 148 to force the ratchet pawl 140 into a position where the first ratchet teeth 144 (including a first ratchet tooth) are in physical engagement with the gear teeth 132 such that rotation of the ratchet pawl 140 in the direction 107 relative to the head 12 and the gear teeth 132 performs a ratcheting function, but rotation of the ratchet pawl 140 in the direction 109 prevents relative rotation of the ratchet pawl 140 (and thus the body 80). Additionally, the second ratchet teeth 146 are not engaged with the gear teeth 132. The ratcheting function that occurs due to rotation of the body 80 in the direction 107 can be implemented due to an ability of the ratchet pawl 140 to pivot or rock at a small angle about the pawl pin 142 due to the spring action of the pawl control member 143 and the orientation of the engaging surface/walls of the pawl control notch 148. Additionally, the selector control member 153 (which may be spring loaded via selector spring 155) is positioned within the selector control notch 158 to force the selector member 150 into a position where the control drive pin 122 is positioned closer to a left, counter-clockwise narrowing end of the respective circular segment region 85 when viewed from the axis 25 and as shown in FIG. 16.

Referring back to FIG. 16, when the yoke 100 and the yoke ring 102 reciprocate and rotate back in the rotational direction 109, due to the positioning of the drive pins 122, 120, the drive pins 122, 120 are urged toward the wider, central portion of the circular segment regions 85 and are therefore not compressed. Due to the relative reduction in the associated frictional force between the drive pins 122, 120 and the inner surface of the yoke ring 102 and the drive edges 84, as well as the engagement between the first ratchet teeth 144 and the gear teeth 132 to prevent movement of the body 80 relative to the head 12, rotation of the yoke ring 102 in the rotational direction 109 does not cause movement of the drive pins 122, 120, and therefore the body 80 and the drive tang 20 do not turn when the yoke ring 102 rotates in the direction 109. In other words, when the yoke 100 and the yoke ring 102 are rotating in the direction 109, the drive pins 122, 120 and the drive edges 84 are not urged to rotate in direction 109 because the inner surface 104 of the yoke ring 102 is permitted to slip relative to the drive pins 122, 120 due to the engagement of the first ratchet teeth 144 with the gear teeth 132.

As such, when the ratchet wrench 10 is in the motorized-turning mode, the drive tang 20 rotates with the yoke 100 in the direction 107, but remains stationary when the yoke 100 rotates in the direction 109. Additionally, in a hand-turning mode, a turning force applied by a user on the handle 16 in the direction 107 will cause the drive pins 122, 120 to be urged toward the narrow end of the circular segment region 85 and be compressed. Also, the positioning of the ratchet pawl 140 causes the first ratchet teeth 144 to catch with the gear teeth 132 and prevent rotation of the drive tang 20 relative to the head 12, thereby permitting continued turning of the drive tang 20 in the direction 107 to support high-torque in the hand-turning mode. Further in the hand-turning mode, if the handle 16 is turned in the direction 109, the drive pins 122, 120 may be urged in a direction towards a wider, central portion of the circular segment regions 85 and be uncompressed and, the positioning of the ratchet pawl 140 permits relative ratcheting movement between the drive tang 20 and the head 12.

FIG. 18 provides another cross-section front view of the head 12 and components of the ratcheting mechanism of ratchet wrench 10 in the configuration opposite that of the components in FIGS. 16 and 17. In this regard, the positional context of the components shown in FIG. 18 provides for the rotational direction 107 (counter-clockwise) to be a fastener stationary direction, while the rotational direction 109 (clockwise) is a fastener turning direction. The operations associated with the directions of rotation are a function of an actuation of the selector switch 40, as further described below, to move the ratchet pawl 140 and the selector member 150 into opposing positions from those of FIGS. 16 and 17.

In this regard, through actuation of the selector switch 40, as further described below, the pawl control member 143 has shifted to urge the ratchet pawl 140 into a position where the first ratchet teeth 144 are no longer in engagement with the gear teeth 132 and the second ratchet teeth 146 are now in engagement with the gear teeth 132. As such, the ratchet pawl 140 and the body 80 may be permitted to rotate relative to the head 12 in the rotational direction 107, but not permitted to rotate relative to the head 12 in the rotational direction 109. Additionally, movement of the selector member 150 has moved the control drive pin 122 into a position where the control drive pin 122, as well as the follower drive pins 120, are disposed on a right, (as viewed from the axis of rotation 25), clockwise side of the circular segment regions 85 due to positioning of the selector switch 40. In operation, the ratchet wrench 10 in this configuration operates similar to the description if FIGS. 16 and 17 provided above, however in the opposite rotational directions.

Referring now to FIG. 19, the selector switch 40 is shown with select components of the ratchet wrench 10, according to some example embodiments. The selector switch 40 may include a switch interface 41, a selector post 42, and a detent spring 46. In this regard, the selector switch 40 may function to both transition the ratchet wrench 10 between a forward turning and reverse turning mode, as well as, lock and unlock a detent of the drive tang 20.

The switch interface 41 may be formed as, for example, a plate with an extended feature that permits a user to rotate the selector switch 40. In this regard, rotation of the selector switch 40 in a first direction may place the ratchet wrench 10 in a forward turning mode (e.g., as shown in FIGS. 16 and 17) and rotation of the selector switch 40 in an opposite, second direction may place the ratchet wrench 10 in a reverse turning mode (e.g., as shown in FIG. 18).

In this regard, the selector post 42, which may extend from the switch interface 41, may include a pawl control cavity 43 and a selector control cavity 53. The pawl control cavity 43 may be configured to receive a pawl spring 145 (not shown) and a pawl control member 143. The pawl spring 145 may be seated in the pawl control cavity 43 and the pawl control member 143, which may be formed as a cylindrically shaped cap, may be disposed over the pawl spring 145 such the pawl control member 143 extends away from the selector post 42. The selector control cavity 53 may be disposed on an opposite side of the selector post 42 from the pawl control cavity 43 and offset from the pawl control cavity 43. Similarly, the selector control cavity 53 may be configured to receive a selector spring 155 (not shown) and a selector control member 153. The selector spring 155 may be seated in the selector control cavity 53 and the selector control member 153, which may be formed as a cylindrically shaped cap, may be disposed over the selector spring 155 such the selector control member 153 also extends away from the selector post 42.

As mentioned above, the selector post 42 may be received in a rear cavity of the body 80. The body 80 may also include openings in each of the side pawl cavity 141 and the side selector cavity 151 through which the pawl control member 143 and the selector control member 153 may engage with the pawl control notch 148 of the ratchet pawl 140 and the selector control notch 158 of the selector member 150, respectively. As such, the selector switch 40 may be rotatable within the body 80 to simultaneously move the ratchet pawl 140 and the selector member 150 between respective positions for the forward turning mode (e.g., as shown in FIGS. 16 and 17) and a reverse turning mode (e.g., as shown in FIG. 18).

In this regard, FIG. 20 shows a perspective view of the ratchet pawl 140 and the selector member 150 in isolation from the body 80 and the selector switch 40. As can been seen in FIG. 20, the pawl spring 145 and the pawl control member 143 are offset from the selector spring 155 and the selector control member 153. Additionally, the engagement between the pawl control member 143 and the ratchet pawl 140 and the selector control member 153 and the selector member 150 is also shown. Further, as described above, the selector member 150 may be engaged with the control drive pin 122 via the control drive pin receptacle 154. As such, through movement of the selector control member 153, via rotation of the selector switch 40, the selector member 150 may be pivoted about the selector pin 152 to, in turn, move the control drive pin 122 and thus the pin ring 110 with the follower drive pins 120. According to some example embodiments, the selector member 150 may therefore be configured to pivot between a first selector member position where the control drive pin 122 is positioned adjacent a first end of a respective drive edge 84 and a second selector member position where the control drive pin 122 is positioned adjacent a second end of a respective drive edge 84.

Referring again to FIG. 19, the selector post 42 may also include a detent cavity 48 that includes an upper, lock level and a lower, unlock level. In this regard, the detent bearing 22 may be configured to remain engaged within a detent bearing opening 23 in the body 80 as described above. However, the selector switch 40 may be pressable into the rear cavity of the body 80, against the bias of the detent spring 46 also disposed in the rear cavity of the body 80. The movement of the selector switch 40 into the body 80 may cause the lower, unlock level of the detent cavity to move behind the detent bearing 22 and permit the detent bearing 22 to retract into the body 80. With the detent bearing 22 in the retracted position, a fastening member (e.g., a socket) with a detent locking groove may be removed from the drive tang 20. Upon release of the pushing force on the selector switch 40, the detent bearing 22 may ride up onto the upper, lock level of the of the detent cavity 48 and be locked in an extended position.

Additionally, with reference to FIG. 21, a portion of the internal components of the handle 16 are shown in the absence of the external housing of the handle 16. In this regard, the motor operation button 30 may be disposed above and motor 60. As described above, the motor operation button 30 be operably coupled to a button extension 32 that is disposed adjacent to the motor 60. The button extension 32 may be an elongated member that is disposed between the motor 60 and the external housing of the handle 16.

The motor 60 may operably couple to the drive shaft 62, such that the mechanical interface is disposed on the upper side of the motor 60. Further, the electrical contacts and other electrical components (e.g., electronic circuitry 70) may be disposed below the motor 60. In this regard, the button extension 32 may permit the motor operation button 30 to be disposed above the motor 60, while actuating a switch 36 below the motor 60 via the button extension 32 and a leaf spring 34 operably coupled to the button extension 32. Further, the electrical interface to the battery 19 may also be disposed below the motor 60.

As described above, the actuation motion of the motor operation button 30 may occur in the direction of the arrows 33. In this regard, the downward and upward movement of the motor operation button 30 and the button extension 32 may occur in parallel with the axis of rotation 45 of the drive shaft 62. By having the movement of the motor operation button 30 in the upward and downward parallel direction, inadvertent depressing of the motor operation button 30 may be avoided, relative to, for example, a button that operates in a direction perpendicular to the axis of rotation 45 of the drive shaft 62.

As such, according to some example embodiments, an example ratchet wrench assembly is provided. The example ratchet wrench assembly may comprise a head, a ratchet gear, a yoke, at least one drive pin, a body, and a ratchet pawl. The ratchet gear may be disposed within the head and may comprise gear teeth. The yoke may be disposed within the head and may be configured to reciprocate about an axis of rotation for rotating a fastener. The yoke may comprise a yoke ring. The body may comprise at least one drive edge and a fastener drive member. A first drive edge of the at least one drive edge may be engaged with a first drive pin of the at least one drive pin such that reciprocation of the yoke causes rotation of the body and the fastener drive member about the axis of rotation via engagement of the first drive pin between the inner surface of the yoke ring and the first drive edge. The ratchet pawl may comprise a first ratchet tooth. The first ratchet tooth may be configured to ratchet against the gear teeth of the ratchet gear to permit movement of the body relative to the head in a first rotational direction and engage the gear teeth to prevent movement of the body relative to the head in second rotational direction. The second rotational direction may be opposite the first rotational direction.

According to some example embodiments, the yoke ring may have a substantially smooth inner surface. Additionally or alternatively, the at least one drive edge may comprise three drive edges oriented in a substantially triangular shape. Additionally or alternatively, each of the drive edges may be substantially linear or substantially arcuate. Additionally or alternatively, the first drive pin may be disposed within a drive pin cavity shaped as a circular segment formed by the inner surface of the yoke ring and the first drive edge of the body. Additionally or alternatively, the first drive pin may be positioned to be under compression between the inner surface of the yoke ring and the first drive edge to rotate the body with the yoke when the yoke rotates in the first rotational direction, and the first drive pin may be positioned to not be under compression between the inner surface of the yoke ring and the first drive edge when the yoke rotates in the second rotational direction such that the rotation of the yoke in the second rotational direction does not cause rotation of the body. Additionally or alternatively, the ratchet gear may be formed on an inner surface of a cavity in the head such that the gear teeth extend towards the axis of rotation. Further, the ratchet pawl may be pivotally affixed to the body. Additionally or alternatively, the yoke my includes a drive bushing receptacle. The ratchet wrench assembly may, additionally or alternatively, further comprise a motor assembly. The motor assembly may comprise a motor configured to generate rotational motion about a motor drive axis (e.g., axis 45), and a drive bushing configured to circularly orbit about the motor drive axis. The drive bushing may be disposed within the drive bushing receptacle of the yoke. The circular orbital motion of the drive bushing resulting from the rotational motion generated by the motor may be converted into reciprocating motion of the yoke about the axis of rotation of the ratchet wrench. Additionally or alternatively, the ratchet pawl may comprise a second ratchet tooth disposed on an opposite front-facing side of the ratchet pawl from the first ratchet tooth. The ratchet wrench assembly may further comprise a selector switch configured to control a ratcheting direction of the ratchet wrench assembly. The selector switch may be configured to pivot the ratchet pawl between a first pawl position where the first ratchet tooth is engaged with the gear teeth and the second ratchet tooth is not engaged with the gear teeth and a second pawl position where the second ratchet tooth is engaged with the gear teeth and the first ratchet tooth is not engaged with the gear teeth. Additionally or alternatively, the selector switch may also configured to simultaneously control pivoting of a selector member and pivoting of the ratcheting pawl. In this regard, the selector member may pivotally affixed to the body and pivotally affixed to the first drive pin. Additionally or alternatively, the selector member may be configured to pivot between a first selector member position where the first drive pin is positioned adjacent a first end of first drive edge and a second selector member position where the first drive pin is positioned adjacent a second end of the first drive edge.

According to some example embodiments, another ratchet wrench assembly is provided. The example ratchet wrench assembly may include a head, a ratchet gear, a yoke, a motor assembly, at least one drive pin, a body, and a ratchet pawl. The ratchet gear may be disposed within the head and may comprise gear teeth. The yoke may be disposed within the head and may be configured to reciprocate about an axis of rotation for rotating a fastener. The yoke may comprise a yoke ring. The motor assembly may be powered by a battery, and the motor assembly may comprise a motor configured to operably couple with the yoke to generate the reciprocating motion of the yoke about the axis of rotation in response to rotational movement of a shaft of the motor. The body may comprise at least one drive edge and a fastener drive member. A first drive edge of the at least one drive edge may be engaged with a first drive pin of the at least one drive pin such that reciprocation of the yoke may cause rotation of the body and the fastener drive member about the axis of rotation via engagement of the first drive pin between the inner surface of the yoke ring and the first drive edge. The ratchet pawl may comprise a first ratchet tooth. The first ratchet tooth may be configured to ratchet against the gear teeth of the ratchet gear to permit movement of the body relative to the head in a first rotational direction and engage the gear teeth to prevent movement of the body relative to the head in second rotational direction. The second rotational direction may be opposite the first rotational direction.

Additionally or alternatively, the ratchet wrench assembly may further comprise electronic circuitry configured to monitor an electrical current to the motor and interrupt the electrical current to the motor in response to the electrical current to the motor exceeding a threshold current. Additionally or alternatively, a motor operation button may be configured to control operation of the motor such that movement of the motor operation button during actuation occurs in a direction parallel with a motor drive shaft axis of rotation. According to some example embodiments, the yoke ring may have a substantially smooth inner surface. Additionally or alternatively, the at least one drive edge may comprise three drive edges oriented in a substantially triangular shape. Additionally or alternatively, each of the drive edges may be substantially linear or substantially arcuate. Additionally or alternatively, the first drive pin may be disposed within a drive pin cavity shaped as a circular segment formed by the inner surface of the yoke ring and the first drive edge of the body. Additionally or alternatively, the first drive pin may be positioned to be under compression between the inner surface of the yoke ring and the first drive edge to rotate the body with the yoke when the yoke rotates in the first rotational direction, and the first drive pin may be positioned to not be under compression between the inner surface of the yoke ring and the first drive edge when the yoke rotates in the second rotational direction such that the rotation of the yoke in the second rotational direction does not cause rotation of the body. Additionally or alternatively, the ratchet gear may be formed on an inner surface of a cavity in the head such that the gear teeth extend towards the axis of rotation. Further, the ratchet pawl may be pivotally affixed to the body. Additionally or alternatively, the yoke my includes a drive bushing receptacle. The ratchet wrench assembly may, additionally or alternatively, further comprise a motor assembly. The motor assembly may comprise a motor configured to generate rotational motion about a motor drive axis (e.g., axis 45), and a drive bushing configured to circularly orbit about the motor drive axis. The drive bushing may be disposed within the drive bushing receptacle of the yoke. The circular orbital motion of the drive bushing resulting from the rotational motion generated by the motor may be converted into reciprocating motion of the yoke about the axis of rotation of the ratchet wrench. Additionally or alternatively, the ratchet pawl may comprise a second ratchet tooth disposed on an opposite front-facing side of the ratchet pawl from the first ratchet tooth. The ratchet wrench assembly may further comprise a selector switch configured to control a ratcheting direction of the ratchet wrench assembly. The selector switch may be configured to pivot the ratchet pawl between a first pawl position where the first ratchet tooth is engaged with the gear teeth and the second ratchet tooth is not engaged with the gear teeth and a second pawl position where the second ratchet tooth is engaged with the gear teeth and the first ratchet tooth is not engaged with the gear teeth. Additionally or alternatively, the selector switch may also configured to simultaneously control pivoting of a selector member and pivoting of the ratcheting pawl. In this regard, the selector member may pivotally affixed to the body and pivotally affixed to the first drive pin. Additionally or alternatively, the selector member may be configured to pivot between a first selector member position where the first drive pin is positioned adjacent a first end of first drive edge and a second selector member position where the first drive pin is positioned adjacent a second end of the first drive edge.

Many modifications and other embodiments of the chuck set forth herein will come to mind to one skilled in the art to which these embodiments pertain having the benefit of the teachings presented in the foregoing descriptions and the associated drawings. Therefore, it is to be understood that the chucks are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed is:

1. A ratchet wrench assembly comprising:

a head;

a ratchet gear disposed within the head and comprising gear teeth;

a yoke disposed within the head and configured to reciprocate about an axis of rotation for rotating a fastener, the yoke comprising a yoke ring;

at least one drive pin;

a body comprising at least one drive edge and a fastener drive member, wherein a first drive edge of the at least one drive edge is engaged with a first drive pin of the at least one drive pin such that reciprocation of the yoke causes rotation of the body and the fastener drive member about the axis of rotation via engagement of the first drive pin between an inner surface of the yoke ring and the first drive edge, the first drive edge being linear for an entire length of the first drive edge; and a ratchet pawl comprising a first ratchet tooth, the first ratchet tooth being configured to ratchet against the gear teeth of the ratchet gear to permit movement of the body relative to the head in a first rotational direction and engage the gear teeth to prevent movement of the body relative to the head in second rotational direction, the second rotational direction being opposite the first rotational direction.

2. The ratchet wrench assembly of claim 1, wherein the yoke ring has a substantially smooth inner surface.

3. The ratchet wrench assembly of claim 1, wherein the at least one drive pin comprises a plurality of drive pins including the first drive pin and the at least one drive edge comprises a plurality of drive edges including the first drive edge.

4. The ratchet wrench assembly of claim 1, wherein the first drive pin is disposed within a drive pin cavity shaped as a circular segment formed by the inner surface of the yoke ring and the first drive edge of the body.

5. The ratchet wrench assembly of claim 4, wherein the first drive pin is positioned to be under compression between the inner surface of the yoke ring and the first drive edge to rotate the body with the yoke when the yoke rotates in the first rotational direction; and wherein the first drive pin is positioned to not be under compression between the inner surface of the yoke ring and the first drive edge when the yoke rotates in the second rotational direction such that the rotation of the yoke in the second rotational direction does not cause rotation of the body.

6. The ratchet wrench assembly of claim 1, wherein the ratchet gear is formed on an inner surface of a cavity in the head such that the gear teeth extend towards the axis of rotation, and wherein the ratchet pawl is pivotably affixed to the body.

7. The ratchet wrench assembly of claim 1, wherein the yoke includes a drive bushing receptacle;

wherein the ratchet wrench assembly further comprises a motor assembly, the motor assembly comprising:

a motor configured to generate rotational motion about a motor drive axis, and a drive bushing configured to circularly orbit about the motor drive axis, the drive bushing being disposed within the drive bushing receptacle of the yoke;

wherein the circular orbital motion of the drive bushing resulting from the rotational motion generated by the motor is converted into reciprocating motion of the yoke about the axis of rotation of the ratchet wrench.

8. The ratchet wrench assembly of claim 1 wherein the ratchet pawl comprises a second ratchet tooth disposed on an opposite front-facing side of the ratchet pawl from the first ratchet tooth; and wherein the ratchet wrench assembly further comprises a selector switch configured to control a ratcheting direction of the ratchet wrench assembly, the selector switch being configured to pivot the ratchet pawl between a first pawl position where the first ratchet tooth is engaged with the gear teeth and the second ratchet tooth is not engaged with the gear teeth and a second pawl position where the second ratchet tooth is engaged with the gear teeth and the first ratchet tooth is not engaged with the gear teeth.

9. The ratchet wrench of claim 1, wherein the first drive edge is defined as a chord that extends linearly between points on the inner surface of the yoke ring.

10. A ratchet wrench assembly comprising:

a head;

a ratchet gear disposed within the head and comprising gear teeth;

a yoke disposed within the head and configured to reciprocate about an axis of rotation for rotating a fastener, the yoke comprising a yoke ring;

at least one drive pin;

a body comprising at least one drive edge and a fastener drive member, wherein a first drive edge of the at least one drive edge is engaged with a first drive pin of the at least one drive pin such that reciprocation of the yoke causes rotation of the body and the fastener drive member about the axis of rotation via engagement of the first drive pin between an inner surface of the yoke ring and the first drive edge, and a ratchet pawl comprising a first ratchet tooth, the first ratchet tooth being configured to ratchet against the gear teeth of the ratchet gear to permit movement of the body relative to the head in a first rotational direction and engage the gear teeth to prevent movement of the body relative to the head in second rotational direction, the second rotational direction being opposite the first rotational direction;

wherein the rachet pawl comprises a second rachet tooth disposed on an opposite front-facing side of the ratchet pawl from the first rachet tooth;

wherein the rachet wrench assembly further comprises a selector switch configured to control a ratcheting direction of the ratchet wrench assembly, the selector switch being configured to pivot the rachet pawl between a first pawl position where the first ratchet tooth is engaged with the gear teeth and the second ratchet tooth is not engaged with the gear teeth and a second pawl position where the second ratchet tooth is engaged with the gear teeth and the first ratchet tooth is not engaged with the gear teeth;

wherein the selector switch is also configured to simultaneously control pivoting of a selector member with movement of the ratcheting pawl, the selector member being pivotably affixed to the body and pivotably affixed to the first drive pin;

wherein selector member is configured to pivot between a first selector member position where the first drive pin is positioned adjacent a first end of first drive edge and a second selector member position where the first drive pin is positioned adjacent a second end of the first drive edge.

11. A ratchet wrench assembly comprising:

a head;

a ratchet gear disposed within the head and comprising gear teeth;

a yoke disposed within the head and configured to reciprocate about an axis of rotation for rotating a fastener, the yoke comprising a yoke ring;

a motor assembly powered by a battery, the motor assembly comprising a motor configured to operably couple with the yoke to generate the reciprocating motion of the yoke about the axis of rotation in response to rotational movement of a shaft of the motor, at least one drive pin;

a body comprising at least one drive edge and a fastener drive member, wherein a first drive edge of the at least one drive edge is engaged with a first drive pin of the at least one drive pin such that reciprocation of the yoke causes rotation of the body and the fastener drive member about the axis of rotation via engagement of the first drive pin between the inner surface of the yoke ring and the first drive edge, the first drive edge being linear for an entire length of the first drive edge; and a ratchet pawl comprising a first ratchet tooth, the first ratchet tooth being configured to ratchet against the gear teeth of the ratchet gear to permit movement of the body relative to the head in a first rotational direction and engage the gear teeth to prevent movement of the body relative to the head in second rotational direction, the second rotational direction being opposite the first rotational direction.

12. The ratchet wrench assembly of claim 11 further comprising electronic circuitry configured to monitor an electrical current to the motor and interrupt the electrical current to the motor in response to the electrical current to the motor exceeding a threshold current.

13. The ratchet wrench assembly of claim 11 further comprising a motor operation button configured to control operation of the motor, wherein movement of the motor operation button during actuation occurs in a direction parallel with a motor drive shaft axis of rotation.

14. The ratchet wrench assembly of claim 11, wherein the yoke ring has a substantially smooth inner surface and wherein the at least one drive edge is linear or arcuate.

15. The ratchet wrench assembly of claim 11, wherein each of the drive edges is substantially linear, and wherein the first drive pin is disposed within a drive pin cavity shaped as a circular segment formed by the inner surface of the yoke ring and the first drive edge of the body.

16. The ratchet wrench assembly of claim 15, wherein the first drive pin is positioned to be under compression between the inner surface of the yoke ring and the first drive edge to rotate the body with the yoke when the yoke rotates in the first rotational direction; and wherein the first drive pin is positioned to not be under compression between the inner surface of the yoke ring and the first drive edge when the yoke rotates in the second rotational direction such that the rotation of the yoke in the second rotational direction does not cause rotation of the body.

17. The ratchet wrench assembly of claim 11, wherein the ratchet gear is formed on an inner surface of a cavity in the head such that the gear teeth extend towards the axis of rotation, and wherein the ratchet pawl is pivotably affixed to the body.

18. The ratchet wrench assembly of claim 11, wherein the yoke includes a drive bushing receptacle; and wherein the motor assembly comprises a drive bushing configured to circularly orbit about a motor shaft axis, the drive bushing being disposed within the drive bushing receptacle of the yoke.

19. The ratchet wrench assembly of claim 11 wherein the ratchet pawl comprises a second ratchet tooth disposed on an opposite front-facing side of the ratchet pawl from the first ratchet tooth; and the ratchet wrench assembly further comprises a selector switch configured to control a ratcheting direction of the ratchet wrench assembly, the selector switch being configured to pivot the ratchet pawl between a first pawl position where the first ratchet tooth is engaged with the gear teeth and the second ratchet tooth is not engaged with the gear teeth and a second pawl position where the second ratchet tooth is engaged with the gear teeth and the first ratchet tooth is not engaged with the gear teeth;

wherein the selector switch is also configured to simultaneously control pivoting of a selector member with movement of the ratcheting pawl, the selector member being pivotably affixed to the body and pivotably affixed to the first drive pin;

wherein selector member is configured to pivot between a first selector member position where the first drive pin is positioned adjacent a first end of first drive edge and a second selector member position where the first drive pin is positioned adjacent a second end of the first drive edge.

20. The ratchet wrench assembly of claim 11, further comprising a selector switch configured to control a ratcheting direction of the ratchet wrench assembly, the selector switch being configured to pivot the ratchet pawl between a first pawl positon for ratcheting in a first ratchet direction and a second pawl position for ratcheting in a second ratchet direction that is opposite the first ratchet direction;

wherein the selector switch is also configured to simultaneously control pivoting of a selector member with movement of the ratcheting pawl, the selector member being pivotably affixed to the body and pivotably affixed to the first drive pin;

wherein selector member is configured to pivot between a first selector member position where the first drive pin is positioned adjacent a first end of first drive edge and a second selector member position where the first drive pin is positioned adjacent a second end of the first drive edge.

* * * * *